US009860541B2

(12) United States Patent
Terada et al.

(10) Patent No.: US 9,860,541 B2
(45) Date of Patent: *Jan. 2, 2018

(54) MOVING PICTURE CODING METHOD, MOVING PICTURE CODING APPARATUS, MOVING PICTURE DECODING METHOD, AND MOVING PICTURE DECODING APPARATUS

(71) Applicant: Sun Patent Trust, New York, NY (US)

(72) Inventors: Kengo Terada, Osaka (JP); Youji Shibahara, Tokyo (JP); Kyoko Tanikawa, Osaka (JP); Hisao Sasai, Osaka (JP); Toshiyasu Sugio, Osaka (JP); Toru Matsunobu, Osaka (JP)

(73) Assignee: SUN PATENT TRUST, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/170,068

(22) Filed: Jun. 1, 2016

(65) Prior Publication Data
US 2016/0277752 A1 Sep. 22, 2016

Related U.S. Application Data

(63) Continuation of application No. 13/902,292, filed on May 24, 2013, now Pat. No. 9,414,057.
(Continued)

(51) Int. Cl.
H04N 7/12 (2006.01)
G06K 9/36 (2006.01)
(Continued)

(52) U.S. Cl.
CPC .......... *H04N 19/21* (2014.11); *H04N 19/132* (2014.11); *H04N 19/463* (2014.11); *H04N 19/82* (2014.11); *H04N 19/91* (2014.11)

(58) Field of Classification Search
CPC .......... H04N 19/463; H04N 19/00127; H04N 19/82; H04N 19/91
See application file for complete search history.

(56) References Cited

U.S. PATENT DOCUMENTS 6,900,748 B2 5/2005 Marpe et al.
7,088,271 B2 8/2006 Marpe et al.
(Continued)

FOREIGN PATENT DOCUMENTS

CN 1949873 4/2007
CN 101771879 7/2010
(Continued)

OTHER PUBLICATIONS

Vivienne Sze et al., "Reduction in context coded bins for ref_idx and cu_qp_delta", Joint Collaborative Team on Video Coding (JCT-VC) of ITU-T SG 16 WP 3 and ISO/IEC JTC 1/SC 29/WG 11, JCTVC-I0204, 9th Meeting: Geneva, CH, Apr. 27-May 7, 2012, pp. 1-5.
(Continued)

Primary Examiner — Tsion B Owens
(74) Attorney, Agent, or Firm — Wenderoth, Lind & Ponack, L.L.P.

(57) ABSTRACT

The moving picture coding method for coding an input image includes: converting a value of a first parameter into a first binary signal, the first parameter identifying a type of a sample offset process to be applied to a reconstructed image corresponding to the input image; and coding at least a portion of the first binary signal through bypass arithmetic coding using a fixed probability.

7 Claims, 38 Drawing Sheets

Related U.S. Application Data

(60) Provisional application No. 61/655,092, filed on Jun. 4, 2012.

(51) Int. Cl.
  *H04N 19/21*   (2014.01)
  *H04N 19/463*  (2014.01)
  *H04N 19/91*   (2014.01)
  *H04N 19/82*   (2014.01)
  *H04N 19/132*  (2014.01)

(56) References Cited

U.S. PATENT DOCUMENTS

| | | | |
|---|---|---|---|
| 7,535,387 B1 | 5/2009 | Delva | |
| 7,860,160 B2 | 12/2010 | Shimazaki et al. | |
| 8,581,753 B2 | 11/2013 | Kim et al. | |
| 8,781,001 B2* | 7/2014 | Sasai | H04N 19/46 348/E7.082 |
| 8,837,582 B2 | 9/2014 | He et al. | |
| 8,907,823 B2 | 12/2014 | Marpe et al. | |
| 8,947,273 B2 | 2/2015 | Bartnik et al. | |
| 9,042,440 B2 | 5/2015 | Sole Rojals et al. | |
| 2001/0017944 A1 | 8/2001 | Kalevo et al. | |
| 2005/0012648 A1 | 1/2005 | Marpe et al. | |
| 2005/0038837 A1 | 2/2005 | Marpe et al. | |
| 2006/0028359 A1* | 2/2006 | Kim | H03M 7/40 341/50 |
| 2006/0156204 A1* | 7/2006 | Lee | H03M 7/40 714/779 |
| 2006/0280371 A1 | 12/2006 | Shimazaki et al. | |
| 2006/0285757 A1 | 12/2006 | Abe et al. | |
| 2007/0040711 A1 | 2/2007 | Ziauddin | |
| 2007/0080832 A1* | 4/2007 | Yang | H03M 7/4006 341/50 |
| 2007/0171985 A1 | 7/2007 | Kim et al. | |
| 2008/0063084 A1 | 3/2008 | Xue et al. | |
| 2009/0089549 A1 | 4/2009 | Liu et al. | |
| 2009/0195681 A1 | 8/2009 | Compton et al. | |
| 2011/0228858 A1 | 9/2011 | Budagavi et al. | |
| 2011/0243226 A1 | 10/2011 | Choi et al. | |
| 2011/0310958 A1 | 12/2011 | Sachdeva et al. | |
| 2012/0014454 A1 | 1/2012 | Budagavi et al. | |
| 2012/0027083 A1 | 2/2012 | Narroschke et al. | |
| 2012/0057637 A1 | 3/2012 | Flachs et al. | |
| 2012/0069906 A1 | 3/2012 | Sato | |
| 2012/0127002 A1 | 5/2012 | Shibahara et al. | |
| 2012/0170647 A1 | 7/2012 | He et al. | |
| 2012/0177107 A1 | 7/2012 | Fu et al. | |
| 2012/0294353 A1 | 11/2012 | Fu et al. | |
| 2012/0300839 A1 | 11/2012 | Sze et al. | |
| 2012/0320971 A1 | 12/2012 | Xu | |
| 2012/0328001 A1 | 12/2012 | He et al. | |
| 2013/0003824 A1 | 1/2013 | Guo et al. | |
| 2013/0003838 A1 | 1/2013 | Gao et al. | |
| 2013/0003840 A1 | 1/2013 | Gao et al. | |
| 2013/0003849 A1 | 1/2013 | Chien et al. | |
| 2013/0016777 A1 | 1/2013 | Gao et al. | |
| 2013/0027230 A1 | 1/2013 | Marpe et al. | |
| 2013/0064294 A1 | 3/2013 | Sole Rojals et al. | |
| 2013/0083856 A1 | 4/2013 | Sole Rojals et al. | |
| 2013/0107951 A1 | 5/2013 | Sole Rojals et al. | |
| 2013/0114668 A1 | 5/2013 | Misra et al. | |
| 2013/0114674 A1* | 5/2013 | Chong | H04N 19/117 375/240.02 |
| 2013/0114691 A1 | 5/2013 | Guo et al. | |
| 2013/0114693 A1 | 5/2013 | Gao et al. | |
| 2013/0114716 A1 | 5/2013 | Gao et al. | |
| 2013/0114738 A1 | 5/2013 | Chien et al. | |
| 2013/0128966 A1 | 5/2013 | Gao et al. | |
| 2013/0129238 A1* | 5/2013 | Sasai | G06T 9/00 382/233 |
| 2013/0136375 A1* | 5/2013 | Sasai | G06T 9/004 382/238 |
| 2013/0177069 A1 | 7/2013 | Sze et al. | |
| 2013/0187796 A1 | 7/2013 | Kim et al. | |
| 2013/0188734 A1 | 7/2013 | Kim et al. | |
| 2013/0223542 A1 | 8/2013 | Kim et al. | |
| 2013/0272389 A1* | 10/2013 | Sze | H04N 19/91 375/240.03 |
| 2013/0294501 A1 | 11/2013 | Sze et al. | |
| 2013/0315297 A1* | 11/2013 | Sasai | H04N 19/00127 375/240.02 |
| 2013/0336382 A1* | 12/2013 | Sole Rojals | H04N 19/70 375/240.02 |
| 2014/0140400 A1 | 5/2014 | George et al. | |
| 2014/0210652 A1 | 7/2014 | Bartnik et al. | |
| 2014/0307778 A1 | 10/2014 | He et al. | |
| 2014/0334559 A1* | 11/2014 | Kim | H04N 19/91 375/240.29 |
| 2015/0098513 A1* | 4/2015 | Fu | H04N 19/91 375/240.25 |
| 2015/0172666 A1 | 6/2015 | Fu et al. | |
| 2015/0181214 A1 | 6/2015 | Alshina et al. | |

FOREIGN PATENT DOCUMENTS

| | | |
|---|---|---|
| CN | 102186087 | 9/2011 |
| CN | 102231830 | 11/2011 |
| JP | 2007-142637 | 6/2007 |
| JP | 2012-023613 | 2/2012 |
| RU | 2 358 410 | 6/2009 |
| RU | 2 370 816 | 10/2009 |
| RU | 2439682 | 1/2012 |
| TW | 200939760 | 9/2009 |
| TW | 201130315 | 9/2011 |
| TW | 201134225 | 10/2011 |
| WO | 2008/002897 | 1/2008 |
| WO | 2013/188558 | 12/2013 |
| WO | 2014/008109 | 1/2014 |
| WO | 2014/014251 | 1/2014 |

OTHER PUBLICATIONS

Office Action dated Oct. 20, 2016 in U.S. Appl. No. 13/898,722.
Office Action dated Oct. 27, 2016 in U.S. Appl. No. 13/897,975.
Office Action dated Nov. 14, 2016 in U.S. Appl. No. 14/509,199.
Office Action dated Nov. 30, 2016 in Russian Patent Application No. 2013157568, with English translation of Search Report.
Benjamin Bross et al., "Suggested bug-fixes for HEVC text specification draft 6", Joint Collaborative Team on Video Coding (JCT-VC) of ITU-T SG16 WP3 and ISO/IEC JTC1/SC29/WG11, JCTVC-I0030, 9th Meeting: Geneva, CH, Apr. 27-May 7, 2012.
"Advanced video coding for generic audiovisual services", ITU-T Recommendation H. 264, Mar. 2010.
Benjamin Bross et al., "High efficiency video coding (HEVC) text specification draft 7", Joint Collaborative Team on Video Coding (JCT-VC) of ITU-T SG16 WP3 and ISO/IEC JTC1/SC29/WG11, JCTVC-I1003_d2, Ver.3, 9th Meeting: Geneva, CH, Apr. 27-May 7, 2012.
Vadim Seregin et al., "Bypass bins for reference index and delta QP coding", Joint Collaborative Team on Video Coding (JCT-VC) of ITU-T SG 16 WP 3 and ISO/IEC JTC 1/SC 29/WG 11, JCTVC-I0594, 9th Meeting: Geneva, CH, Apr. 27-May 7, 2012.
Benjamin Bross et al., "High efficiency video coding (HEVC) text specification draft 6", Joint Collaborative Team on Video Coding (JCT-VC) of ITU-T SG16 WP3 and ISO/IEC JTC1/SC29/WG11, JCTVC-H1003, 8th Meeting: San José, CA, USA, Feb. 1-10, 2012.
Benjamin Bross et al., "High efficiency video coding (HEVC) text specification draft 7", Joint Collaborative Team on Video Coding (JCT-VC) of ITU-T SG16 WP3 and ISO/IEC JTC1/SC29/WG11, JCTVC-I1003_d1, Ver.2, 9th Meeting: Geneva, CH, Apr. 27-May 7, 2012.
Benjamin Bross et al., "Suggested bug-fixes for HEVC text specification draft 6", Joint Collaborative Team on Video Coding (JCT-VC) of ITU-T SG16 WP3 and ISO/IEC JTC1/SC29/WG11, JCTVC-I0030, 9th Meeting: Geneva, CH, Apr. 27-May 7, 2012, Version 3.

(56) References Cited

OTHER PUBLICATIONS

International Search Report dated Aug. 20, 2013 in International (PCT) Application No. PCT/JP2013/003141.
International Search Report dated Jul. 9, 2013 in International (PCT) Application No. PCT/JP2013/002396.
International Search Report dated Aug. 6, 2013 in International (PCT) Application No. PCT/JP2013/003113.
International Search Report dated Aug. 20, 2013 in International (PCT) Application No. PCT/JP2013/003158.
Vadim Seregin, "Binarisation modification for last position coding", Joint Collaborative Team on Video Coding (JCT-VC) of ITU-T SG 16 WP3 and ISO/EC JCT1/SC29/WG11, JCTVC-F375, 6th Meeting: Torino, IT, Jul. 14-22, 2011.
Hisao Sasai, "Modified MVD coding for CABAC", Joint Collaborative Team on Video Coding (JCT-VC) of ITU-T SG 16 WP3 and ISO/IEC JTC1/SC29/WG11 JCTVC-F423, 6th Meeting: Torino, IT, Jul. 14-22, 2011.
Chih-Ming Fu et al., "Non-CE1: Bug-fix of offset coding in SAO interleaving mode", Joint Collaborative Team on Video Coding (JCT-VC) of ITU-T SG16 WP3 and ISO/IEC JTC1/SC29/WG11 JCTVC-I0168, 9th Meeting: Geneva, CH, Apr. 27-May 7, 2012.
Yu-Wen Huang, "BoG report on SAO", Joint Collaborative Team on Video Coding (JCT-VC) of ITU-T SG16 WP3 and ISO/IEC JTC1/SC29/WG11 JCTVC-I0576, 9th Meeting: Geneva, CH, Apr. 27-May 7, 2012.
Vivienne Sze, "Reduction in context coded bins for ref_idx and cu_qo_delta", Joint Collaborative Team on Video Coding (JCT-VC) of ITU-T SG16 WP3 and ISO/IEC JTC1/SC29/WG11, JCTVC-I0204, 9th Meeting: Geneva, CH, Apr. 27,May 7, 2012.
Yu-Wen Huang, "BoG report on intergrated text of SAO adoptions on top of JCTVC-I0030", Joint Collaborative Team on Video Coding (JCT-VC) of ITU-T SG16 WP3 and ISO/IEC JTC1/SC29/WG11, JCTVC-I0602, 9th Meeting: Geneva, CH, Apr. 27-May 7, 2012.
Written Opinion of the International Searching Authority dated Jul. 9, 2013 in International (PCT) Application No. PCT/JP2013/002396 (with English translation).
Extended European Search Report dated Mar. 27, 2015 in corresponding European Application No. 13800607.7.
E. Maani et al., "SAO Type Coding Simplification", Joint Collaborative Team on Video Coding (JCT-VC) of ITU-T SG16 WP3 and ISO/IEC JTC1/SC29/WG11, JCTVC-I0246, $9^{th}$ Meeting: Geneva, CH, Apr. 27-May 7, 2012, XP030052835.
Tom Matsunobu et al., "AHG5/AHG6: Bypass coding for SAO syntax elements", Joint Collaborative Team on Video Coding (JCT-VC) of ITU-T SG16 WP3 and ISO/IEC JTC1/SC29/WG11, JCTVC-J0148, $10^{th}$ Meeting: Stockholm, SE, Jul. 11-20, 2012, XP030112510.
C. Rosewarne et al., "AHG5: On SAO syntax elements coding", Joint Collaborative Team on Video Coding (JCT-VC) of ITU-T SG16 WP3 and ISO/IEC JTC1/SC29/WG11, JCTVC-J0178, $10^{th}$ Meeting: Stockholm, SE, Jul. 11-20, 2012, XP030112540.
Akira Minezawa et al., "Non-CE1: Improved edge offset coding for SAO", Joint Collaborative Team on Video Coding (JCT-VC) of ITU-T SG16 WP3 and ISO/IEC JTC1/SC29/WG11, JCTVC-I0066, $9^{th}$ Meeting: Geneva, CH, Apr. 27-May 7, 2012, XP030111829.
Extended European Search Report dated Mar. 27, 2015 in European Application No. 13793080.6.
Extended European Search Report dated Jul. 27, 2015 in European Application No. 13794340.3.
Office Action dated Oct. 26, 2015 in Mexican Application No. MX/A/2013/014753, with English translation.
Joel Sole et al., "AhG6: Bypass bins grouping in SAO", Joint Collaborative Team on Video Coding (JCT-VC) of ITU-T SG16 WP3 and ISO/IEC JTC1/SC29/WG11, JCTVC-J0054, 10th Meeting: Stockholm, SE, Jul. 11-20, 2012, XP030112416.
Akira Minezawa et al., "Non-CE1: Improved edge offset coding for SAO", Joint Collaborative Team on Video Coding (JCT-VC) of ITU-T SG16 WP3 and ISO/IEC JTC1/SC29/WG11, JCTVC-I0066_r2, 9th Meeting: Geneva, CH, Apr. 27-May 7, 2012, XP030052650.
Guillaume Laroche et al., "Non-CE1: On SAO parameters reduction for Chroma", Joint Collaborative Team on Video Coding (JCT-VC) of ITU-T SG16 WP3 and ISO/IEC JTC1/SC29/WG11, JCTVC-I0183, 9th Meeting: Geneva, CH, Apr. 27-May 7, 2012, XP030111946.
Detlev Marpe et al., "Context-Based Adaptive Binary Arithmetic Coding in the H.264/AVC Video Compression Standard", IEEE Transactions on Circuits and Systems for Video Technology, vol. 13, No. 7, Jul. 1, 2003, pp. 620-636, XP0055120073.
Woo-Shik Kim et al., "AhG6: SAO Offset Bypass Coding", Joint Collaborative Team on Video Coding (JCT-VC) of ITU-T SG16 WP3 and ISO/IEC JTC1/SC29/WG11, JCTVC-J0141, 10th Meeting: Stockholm, SE, Jul. 11-20, 2012, XP030112503.
Examination Report dated Jan. 17, 2017 in Singapore Application No. 201400081-4.
Notice of Allowance dated Apr. 25, 2017 in U.S. Appl. No. 13/898,722.
Office Action dated May 18, 2017 in U.S. Appl. No. 13/897,975.
Office Action dated May 25, 2017 in U.S. Appl. No. 14/509,199.
Tom Matsunobu et al., "AHGS/AHG6: Bypass coding for SAO syntax elements", Joint Collaborative Team on Video Coding (JCT-VC) of ITU-T SG 16 WP 3 and ISO/IEC JTC 1/SC 29/WG 11, 10th Meeting: Stockholm, Sweden, Jul. 11-20, 2012, Jul. 11, 2012, JCTVC-J0148r1.doc, URL, http://phenix.it-sudparis.eu/jct/doc_end_user/documents/10Stockholm/wg11/JCTVC-J0148-v3.zip.
In Suk Chong et al., "AHG6/AHG5: Simplified SAO coding", Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, Jul. 9, 2012, JCTVC-J0347-v3.doc, URL, http://phenix.it-sudparis.eu/jct/doc_end_user/documents/10_Stockholm/wg11/JCTVC-J0347-v4.zip.
In Suk Chong et al., "AHG6/AHGS: SAO offset coding", Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, Jul. 3, 2012, JCTVC-J0106, URL, http://phenix.it-sudparis.eu/jct/doc_end_user/documents/10_Stockholm/wg11/JCTVC-J0106-v2.zip.
Woo-shik Kim et al., "AhG6: SAO Offset Bypass Coding", Joint Collaborative Team on Video Coding (JCT-VC) of ITU-T SG 16 WP 3 and ISO/IEC JTC1/SC 29/WG 11, 10th Meeting: Stockholm, SE, Jul. 11-20, 2012, Jul. 11, 2012, JCTVC-J0141, URL, http://phenix.it-sudparis.eu/jct/doc_end_user/documents/10_Stockholm/wg11/JCTVC-J0141-v2.zip.
Elena Alshina et al., "AHG6: On left band position coding in SAO", Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, Jul. 11, 2012, JCTVC-J0046, URL, http://phenix.it-sudparis.eu/jct/doc_end_user/documents/10_Stockholm/wg11/JCTVC-J0046-v3.zip.
Jun Xu et al., "AHG6: on SAO signalling", Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, Jul. 14, 2012, JCTVC-J0268_r2.doc, URL, http://phenix.it-sudparis.eu/jct/doc_end_user/documents/10_Stockholm/wg11/JCTVC-J0268-v4.zip.

* cited by examiner

FIG. 7

| Non-binary signal | Binary signal | | | | |
|---|---|---|---|---|---|
| | binIdx | | | | |
| | 0 | 1 | 2 | 3 | 4 |
| 0 | 0 | | | | |
| 1 | 1 | 0 | | | |
| 2 | 1 | 1 | 0 | | |
| 3 | 1 | 1 | 1 | 0 | |
| 4 | 1 | 1 | 1 | 1 | 0 |
| 5 | 1 | 1 | 1 | 1 | 1 |

FIG. 8

|  | binIdx | | | | |
|---|---|---|---|---|---|
|  | 0 | 1 | 2 | 3 | 4 |
| Embodiment 1 | Context 0 | Context 1 | Bypass | Bypass | Bypass |
| Variation 1 | Context 0 | Bypass | Bypass | Bypass | Bypass |
| Variation 2 | Bypass | Bypass | Bypass | Bypass | Bypass |

FIG. 9

|  | Main ||| HE10 |||
| --- | --- | --- | --- | --- | --- | --- |
|  | AI | RA | LB | AI | RA | LB |
| Embodiment 1 | 0.00 | 0.01 | 0.02 | 0.00 | -0.03 | 0.04 |
| Variation 1 | 0.00 | -0.04 | 0.06 | 0.00 | -0.01 | -0.01 |
| Variation 2 | 0.02 | 0.84 | 0.85 | 0.00 | 0.53 | 0.67 |

FIG. 10

| Non-binary signal | Binary signal | |
|---|---|---|
| | binIdx | |
| | 0 | 1 |
| 0 | 0 | |
| 1 | 1 | 0 |
| 2 | 1 | 1 |

FIG. 11

| | binIdx | |
|---|---|---|
| | 0 | 1 |
| Variation 3 | Context 0 | Bypass |

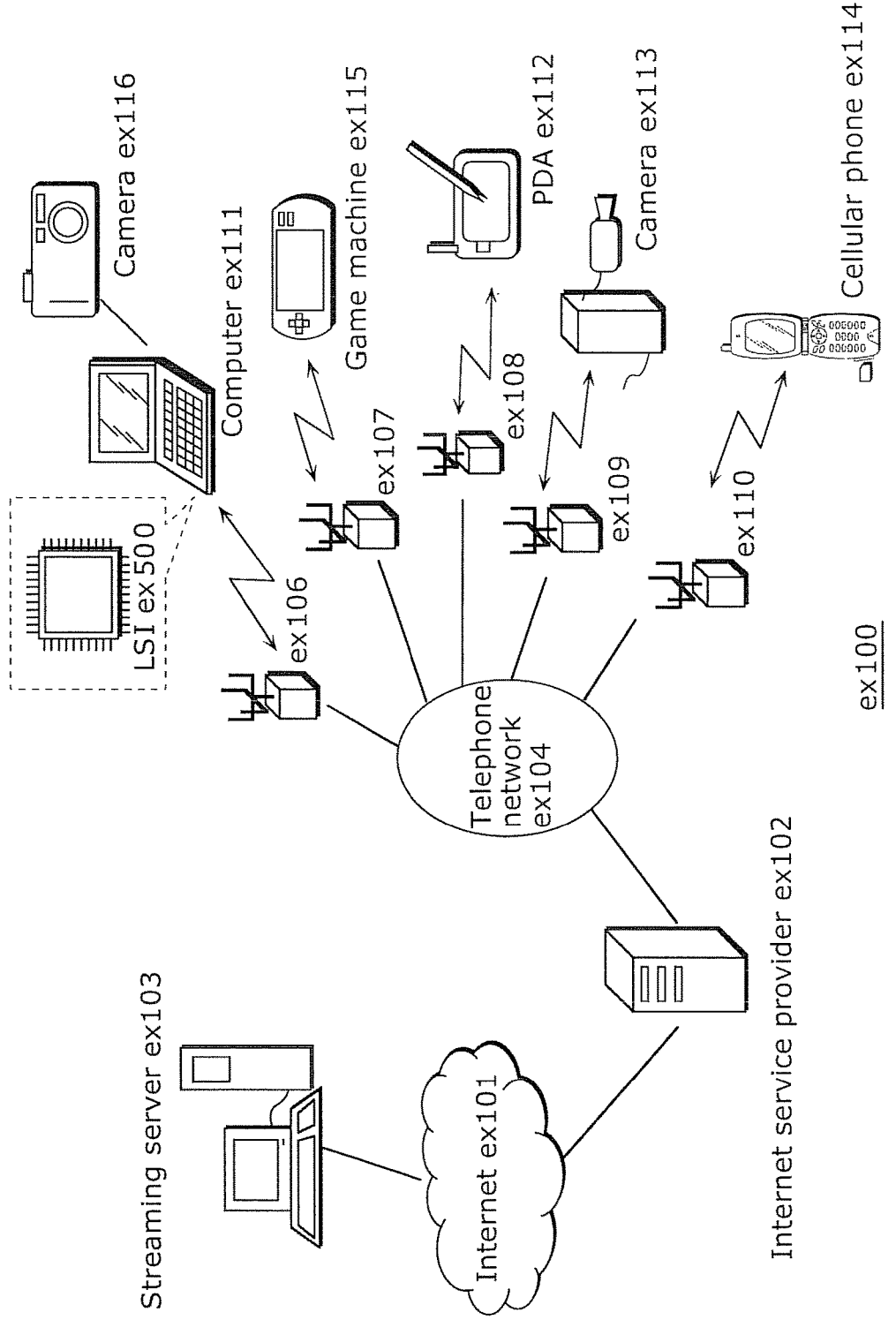

FIG. 26

Video stream (PID=0x1011, Primary video)
Audio stream (PID=0x1100)
Audio stream (PID=0x1101)
Presentation graphics stream (PID=0x1200)
Presentation graphics stream (PID=0x1201)
Interactive graphics stream (PID=0x1400)
Video stream (PID=0x1B00, Secondary video)
Video stream (PID=0x1B01, Secondary video)

FIG. 29
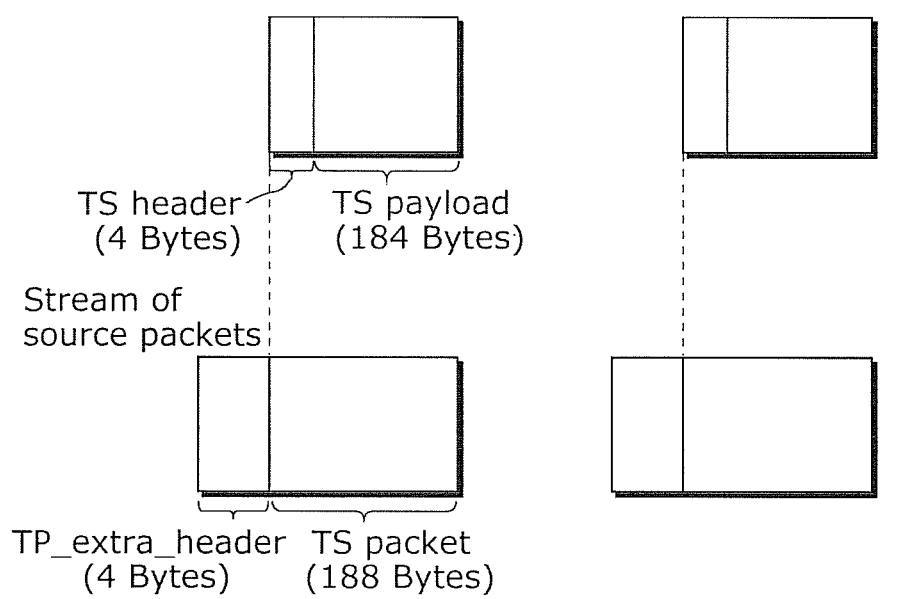
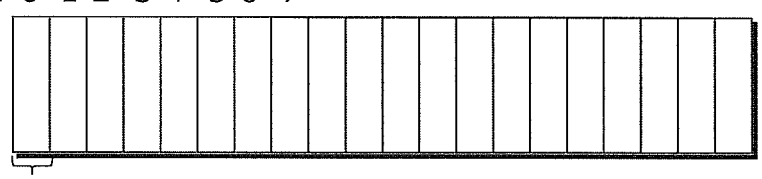

FIG. 37

| Corresponding standard | Driving frequency |
|---|---|
| MPEG-4 AVC | 500 MHz |
| MPEG-2 | 350 MHz |
| ⋮ | ⋮ |

MOVING PICTURE CODING METHOD, MOVING PICTURE CODING APPARATUS, MOVING PICTURE DECODING METHOD, AND MOVING PICTURE DECODING APPARATUS

FIELD

One or more exemplary embodiments disclosed herein relate to an apparatus and a method for coding or decoding a moving picture, and in particular to arithmetic coding or arithmetic decoding on a sample adaptive offset (SAO) parameter.

BACKGROUND

Recent years have seen the significant technical development in digital video apparatuses, and increasing chances for compression-coding a video (moving picture) signal (a plurality of pictures arranged in time series) and recording the video signal onto recording media such as DVDs and hard disks or distributing the video signal on the Internet. The H.264/AVC (MPEG-4 AVC) is one of the image coding standards, and the High Efficiency Video Coding (HEVC) standard is currently being considered as a next-generation standard.

The HEVC standard described in NPL 1 proposes a sample offset process called SAO. The SAO process is a process for adding an offset value to a sample value (pixel value) in an image (reconstructed image) decoded from a bitstream. Accordingly, the reconstructed image in which the SAO process has been performed enables faithful reproduction of an original image (input image) before coding and reduction in image degradation by the coding.

CITATION LIST

Non Patent Literature

[NPL 1] Joint Collaborative Team on Video Coding (JCT-VC) of ITU-T SG16 WP3 and ISO/IEC JTC1/SC29/WG11, 9th Meeting: Geneva, CH, 27 Apr.-7 May 2012, JCTVC-I0602_CDTexts_r3.doc, BoG report on integrated text of SAO adoptions on top of JCTVC-I0030, http://phenix.it-sudparis.eu/jct/doc_end_user/documents/9_Genev a/wg11/JCTVC-I0602-v4.zip

SUMMARY

Technical Problem

The moving picture coding/decoding processes using the conventional sample offset process require suppression of decrease in the coding efficiency and acceleration of processing or reduction in the processing load.

Thus, one or more exemplary embodiments disclosed provide a moving picture coding method and a moving picture decoding method that can accelerate processing or reduce the processing load while suppressing decrease in the coding efficiency in the moving picture coding/decoding processes using the sample offset process.

Solution to Problem

The moving picture coding method according to an aspect of the present disclosure is a moving picture coding method for coding an input image, and includes: converting a value of a first parameter into a first binary signal, the first parameter identifying a type of a sample offset process to be applied to a reconstructed image corresponding to the input image; and coding at least a portion of the first binary signal through bypass arithmetic coding using a fixed probability.

The general or specific aspects may be implemented by a system, an apparatus, an integrated circuit, a computer program, or a computer-readable recording medium, or by an arbitrary combination of the system, the apparatus, the integrated circuit, the computer program, and the recording medium.

Advantageous Effects

The moving picture coding and decoding methods according to an aspect of the present disclosure can accelerate processing or reduce the processing load while suppressing decrease in the coding efficiency, in the moving picture coding/decoding processes using the sample offset process.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 7 is a table indicating a correspondence between non-binary signals and binary signals according to Embodiment 1.

FIG. 8 is a table indicating a correspondence between binIdxs and contexts according to Embodiment 1 and Variations 1 and 2.

FIG. 9 is a table showing a result of experiment in which the coding efficiencies between the conventional technique and Embodiment 1 and Variations 1 and 2 are compared.

FIG. 10 is a table indicating a correspondence between non-binary signals and binary signals according to Variation 3.

FIG. 11 is a table indicating a correspondence between binIdxs and a context according to Variation 3.

FIG. 20 illustrates an overall configuration of a content providing system for implementing content distribution services.

FIG. 26 illustrates a structure of multiplexed data.

FIG. 29 illustrates a structure of TS packets and source packets in the multiplexed data.

FIG. 37 illustrates an example of a look-up table in which the standards of video data are associated with the driving frequencies.

DESCRIPTION OF EMBODIMENTS

Figure 1:
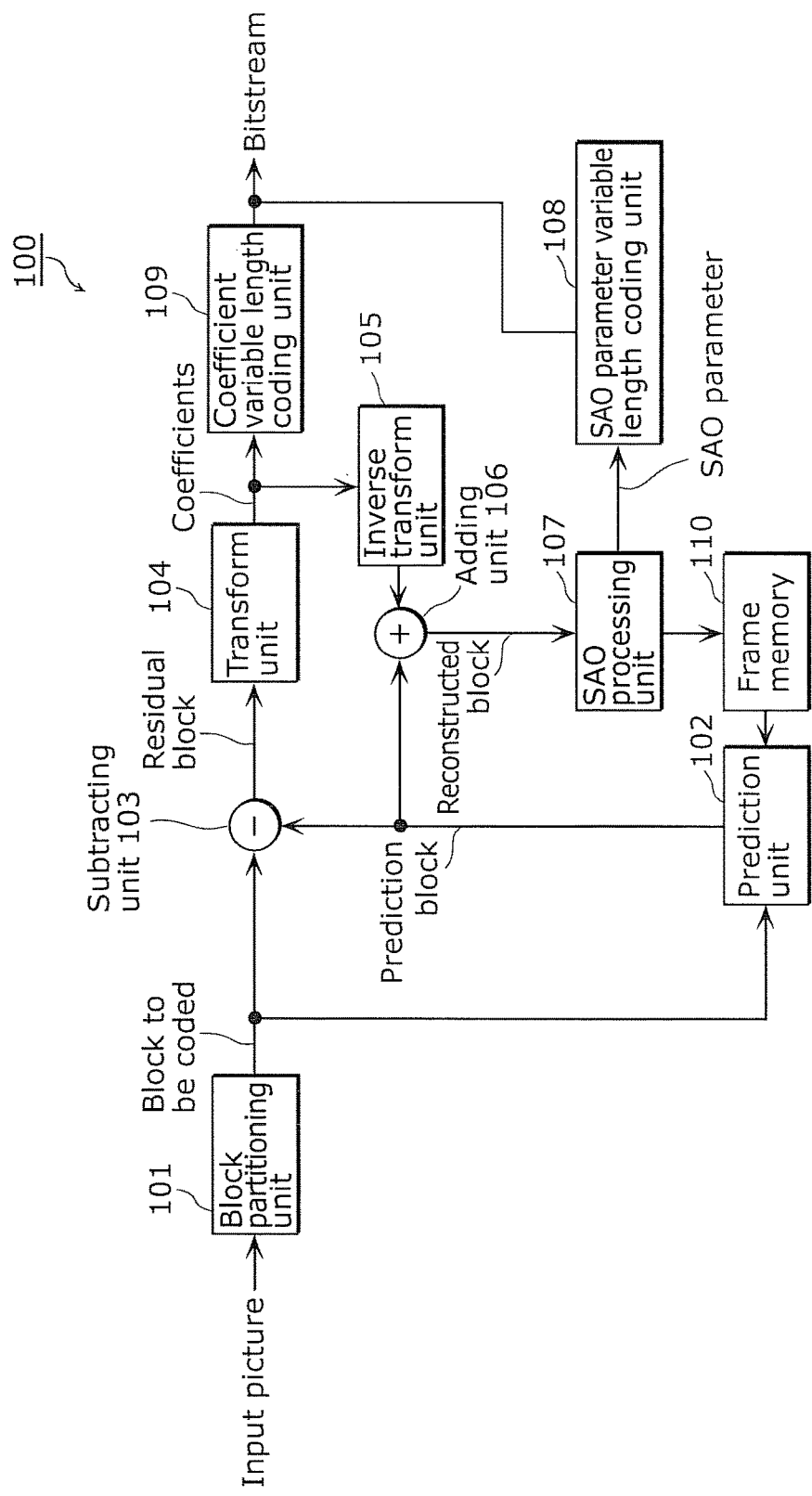
FIG. 1 is a block diagram illustrating a configuration of a moving picture coding apparatus according to Embodiment 1.

Knowledge on which the Present Disclosure is Based

In the SAO process, pixels included in a reconstructed image are classified into categories. For each of the categories, an offset value corresponding to the category is added to a pixel value belonging to the category. There are plural methods for classifying pixels. Specifically, arithmetic coding is performed on a parameter indicating a classification method used in the actual coding (that is, parameter (sao_type_idx) for identifying a type of a sample offset process), and the parameter is added to a bitstream.

Furthermore, in accordance with the HEVC standard, a signal to be coded is converted (binarized) from a non-binary signal to a binary signal (signal representing 0 and 1), and then the arithmetic coding is performed on the binary signal.

The binary signal is a signal including at least one of bits representing one of two symbols (0 and 1). Each of the bits is also referred to as "bin" in the Description. Here, the binary signal is also referred to as "bin string".

In accordance with the HEVC standard, two types of arithmetic coding are defined, namely, context-adaptive arithmetic coding and bypass arithmetic coding. In the context-adaptive arithmetic coding, arithmetic coding is performed on a binary signal using a symbol occurrence probability adaptively selected based on a context. Furthermore, in the bypass arithmetic coding, arithmetic coding is performed on a binary signal using a fixed symbol occurrence probability (for example, 50%).

More specifically, in the context-adaptive arithmetic coding, a context is selected, for example, per bin included in a binary signal to be coded. Then, probability information of the selected context is loaded, and arithmetic coding is performed on the bin using a symbol occurrence probability identified by the probability information. Furthermore, the probability information (symbol occurrence probability) of the selected context is updated according to a value (symbol) of the bin in which the arithmetic coding has been performed.

In contrast, in the bypass arithmetic coding, arithmetic coding is performed on a bin by fixing the symbol occurrence probability to 50% without using any context. Thus, no probability information on the context is loaded or updated in the bypass arithmetic coding.

Conventionally, since it seems that each bin included in a binary signal corresponding to sao_type_idx has a bias in the symbol occurrence probability, the context-adaptive arithmetic coding is performed on the bin. Thus, the processing load for loading or updating probability information on a context increases in the conventional coding of sao_type_idx. Furthermore, when arithmetic coding is performed on two bits using the same context, the arithmetic coding on the second bit cannot be started until the context updating process on the first bit is completed. Thus, the arithmetic coding on sao_type_idx becomes sequential, and the throughput is reduced.

The moving picture coding method according to an aspect of the present disclosure is a moving picture coding method for coding an input image, and includes: converting a value of a first parameter into a first binary signal, the first parameter identifying a type of a sample offset process to be applied to a reconstructed image corresponding to the input image; and coding at least a portion of the first binary signal through bypass arithmetic coding using a fixed probability.

Accordingly, the portion of the first binary signal corresponding to the value of the first parameter for identifying a type of the sample offset process can be coded through the bypass arithmetic coding. The number of loading and updating of probability information corresponding to a context can be reduced more than that of coding all the binary signals by the context-adaptive arithmetic coding. Furthermore, since the bypass arithmetic coding does not require updating the probability information, arithmetic coding can be performed, in parallel, on bits included in a binary signal.

Furthermore, since the binary signal corresponding to the value of the first parameter conventionally has a bias in the symbol occurrence probability, it seems that the coding efficiency significantly decreases when the binary signal is coded through the bypass arithmetic coding. However, the present disclosure reveals that the coding efficiency does not significantly decrease even when at least a portion of the binary signal corresponding to the value of the first parameter is coded through the bypass arithmetic coding.

In other words, by coding at least the portion of the binary signal corresponding to the value of the first parameter for identifying a type of the sample offset process through the bypass arithmetic coding, processing can be accelerated or the processing load can be reduced while decrease in the coding efficiency can be suppressed.

For example, a first portion of the first binary signal may be coded through context-adaptive arithmetic coding, and a second portion of the first binary signal may be coded through the bypass arithmetic coding when the first binary signal includes the second portion subsequent to the first portion.

Accordingly, the first portion of the binary signal can be coded through the context-adaptive arithmetic coding, and the second portion of the binary signal can be coded through the bypass arithmetic coding. Thus, it is possible to switch the arithmetic coding between the first portion having a larger bias in the symbol occurrence probability and the second portion having a smaller bias in the symbol occurrence probability, and decrease in the coding efficiency can be further suppressed.

For example, the sample offset process may not be applied to the reconstructed image when the value of the first parameter is equal to a predetermined value, and the first portion of the first binary signal may indicate whether or not the value of the first parameter is equal to the predetermined value.

Accordingly, the first portion indicating whether or not the value of the first parameter is equal to the predetermined value can be coded through the context-adaptive arithmetic coding. In other words, the first portion indicating whether or not the sample offset process is applied to the reconstructed image can be coded through the context-adaptive arithmetic coding. Since the portion indicating whether or not the sample offset process is applied to the reconstructed image has a larger bias in the symbol occurrence probability, decrease in the coding efficiency can be further suppressed.

For example, the first portion of the first binary signal may be composed of a first bit of the first binary signal, and the second portion of the first binary signal may be composed of the remaining bits of the first binary signal.

Accordingly, the first bit of the binary signal can be coded through the context-adaptive arithmetic coding, and the remaining bits of the binary signal can be coded through the bypass arithmetic coding.

For example, the moving picture coding method may further include: converting at least one of a value of a second parameter and a value of a third parameter into a second binary signal, the second parameter identifying an intra prediction mode, the third parameter identifying a candidate to be used for inter prediction from a list of candidates each including at least one motion vector; coding a first portion of the second binary signal through the context-adaptive arithmetic coding; and coding a second portion of the second binary signal through the bypass arithmetic coding when the second binary signal includes the second portion subsequent to the first portion, wherein a bit length of the first portion of the first binary signal may be identical to a bit length of the first portion of the second binary signal.

Accordingly, since switching the arithmetic coding between the first parameter for identifying a type of a sample offset process and another parameter (second parameter or third parameter) can be standardized, the configuration of the coding apparatus can be simplified.

For example, the first binary signal may include one or more first bits having a first symbol when the value of the first parameter is larger than 0, the number of the first bits being equal to the value of the first parameter, and the first binary signal may (a) further include one or more second bits having a second symbol when the value of the first parameter is smaller than a maximum value, and (b) not include the second bits when the value of the first parameter is equal to the maximum value.

Accordingly, when the value of the first parameter is equal to the maximum value, the second bit (for example, 0) having the second symbol can be omitted. Thus, the coding efficiency can be improved.

Furthermore, the moving picture decoding method according to an aspect of the present disclosure is a moving picture decoding method for decoding a coded image, and includes: decoding at least a coded portion of a first binary signal through bypass arithmetic decoding using a fixed probability, the first binary signal corresponding to a value of a first parameter identifying a type of a sample offset process to be applied to a reconstructed image obtained from the coded image; and converting the decoded first binary signal into the value of the first parameter.

Accordingly, at least the portion of the binary signal corresponding to the value of the first parameter for identifying a type of the sample offset process can be decoded through the bypass arithmetic decoding. Thus, the number of loading and updating probability information corresponding to a context can be reduced more than that of decoding all the binary signals by the context-adaptive arithmetic decoding. Furthermore, since the bypass arithmetic decoding does not require updating the probability information, arithmetic decoding can be performed, in parallel, on bits included in a binary signal.

Furthermore, since the binary signal corresponding to the value of the first parameter conventionally has a bias in the symbol occurrence probability, it seems that the coding efficiency significantly decreases when the binary signal is coded through the bypass arithmetic coding. However, the present disclosure reveals that the coding efficiency does not significantly decrease even when at least a portion of the binary signal corresponding to the value of the first parameter is coded through the bypass arithmetic coding.

In other words, by decoding at least the coded portion of the binary signal corresponding to the value of the first parameter for identifying a type of the sample offset process through the bypass arithmetic coding, processing can be accelerated or the processing load can be reduced while decrease in the coding efficiency can be suppressed.

For example, a coded first portion of the first binary signal may be decoded through context-adaptive arithmetic decoding, and a coded second portion of the first binary signal may be decoded through the bypass arithmetic decoding when the first binary signal includes the second portion subsequent to the first portion. Accordingly, the coded first portion of the binary signal can be decoded through the context-adaptive arithmetic decoding, and the coded second portion of the binary signal can be decoded through the bypass arithmetic decoding. Thus, the coded binary signal can be decoded by switching between the first portion having a larger bias in the symbol occurrence probability and the second portion having a smaller bias in the symbol occurrence probability, and the decrease in the coding efficiency can be further suppressed.

For example, the sample offset process may not be applied to the reconstructed image when the value of the first parameter is equal to a predetermined value, and the first portion of the first binary signal may indicate whether or not the value of the first parameter is equal to the predetermined value.

Accordingly, the first portion indicating whether or not the value of the first parameter is equal to the predetermined value can be decoded through the context-adaptive arithmetic decoding. In other words, the coded first portion indicating whether or not the sample offset process is applied to the reconstructed image can be decoded through the context-adaptive arithmetic decoding. Since the portion indicating whether or not the sample offset process is applied to the reconstructed image has a larger bias in the symbol occurrence probability, the decrease in the coding efficiency can be further suppressed.

For example, the first portion of the first binary signal may be composed of a first bit of the first binary signal, and the second portion of the first binary signal may be composed of the remaining bits of the first binary signal.

Accordingly, the coded first bit of the binary signal can be decoded through the context-adaptive arithmetic decoding, and the remaining bits of the binary signal can be decoded through the bypass arithmetic decoding.

For example, the moving picture decoding method may further include: decoding a coded first portion of a second binary signal corresponding to at least one of a value of a second parameter and a value of a third parameter, through the context-adaptive arithmetic decoding, the second parameter identifying an intra prediction mode, the third parameter identifying a candidate to be used for inter prediction from a list of candidates each including at least one motion vector; and decoding a coded second portion of the second binary signal through the bypass arithmetic decoding when the second binary signal includes the second portion subsequent to the first portion, wherein a bit length of the first portion of the first binary signal may be identical to a bit length of the first portion of the second binary signal.

Accordingly, since switching the arithmetic decoding between the first parameter for identifying a type of a sample offset process and another parameter (second parameter or third parameter) can be standardized based on the bit position of the binary signal, the configuration of the decoding apparatus can be simplified.

For example, the first binary signal may include one or more first bits having a first symbol when the value of the first parameter is larger than 0, the number of the first bits being equal to the value of the first parameter, and the first binary signal may (a) further include one or more second bits having a second symbol when the value of the first parameter is smaller than a maximum value, and (b) not include the second bits when the value of the first parameter is equal to the maximum value.

Accordingly, when the value of the first parameter is equal to the maximum value, the second bit (for example, 0) having the second symbol can be omitted. Thus, the coding efficiency can be improved.

These general or specific aspects may be implemented by a system, an apparatus, an integrated circuit, a computer program, or a computer-readable recording medium, or by an arbitrary combination of the system, the apparatus, the integrated circuit, the computer program, and the recording medium.

Embodiments will be described will be described with reference to the drawings.

Embodiments described hereinafter indicate specific or generic examples of the present disclosure. The values, shapes, materials, constituent elements, positions and connections of the constituent elements, steps, and orders of the steps indicated in Embodiments are examples, and do not limit the claims. Furthermore, the constituent elements in Embodiments that are not described in independent claims that describe the most generic concept of the present disclosure are described as arbitrary constituent elements.

Embodiment 1

Overall Configuration

FIG. 1 illustrates a configuration of a moving picture coding apparatus 100 according to Embodiment 1. The moving picture coding apparatus 100 codes an input picture per block.

As illustrated in FIG. 1, the moving picture coding apparatus 100 includes a block partitioning unit 101, a prediction unit 102, a subtracting unit 103, a transform unit 104, an inverse transform unit 105, an adding unit 106, an SAO processing unit 107, an SAO parameter variable length coding unit 108, a coefficient variable length coding unit 109, and a frame memory 110.

<Overall Operations>

Figure 2:
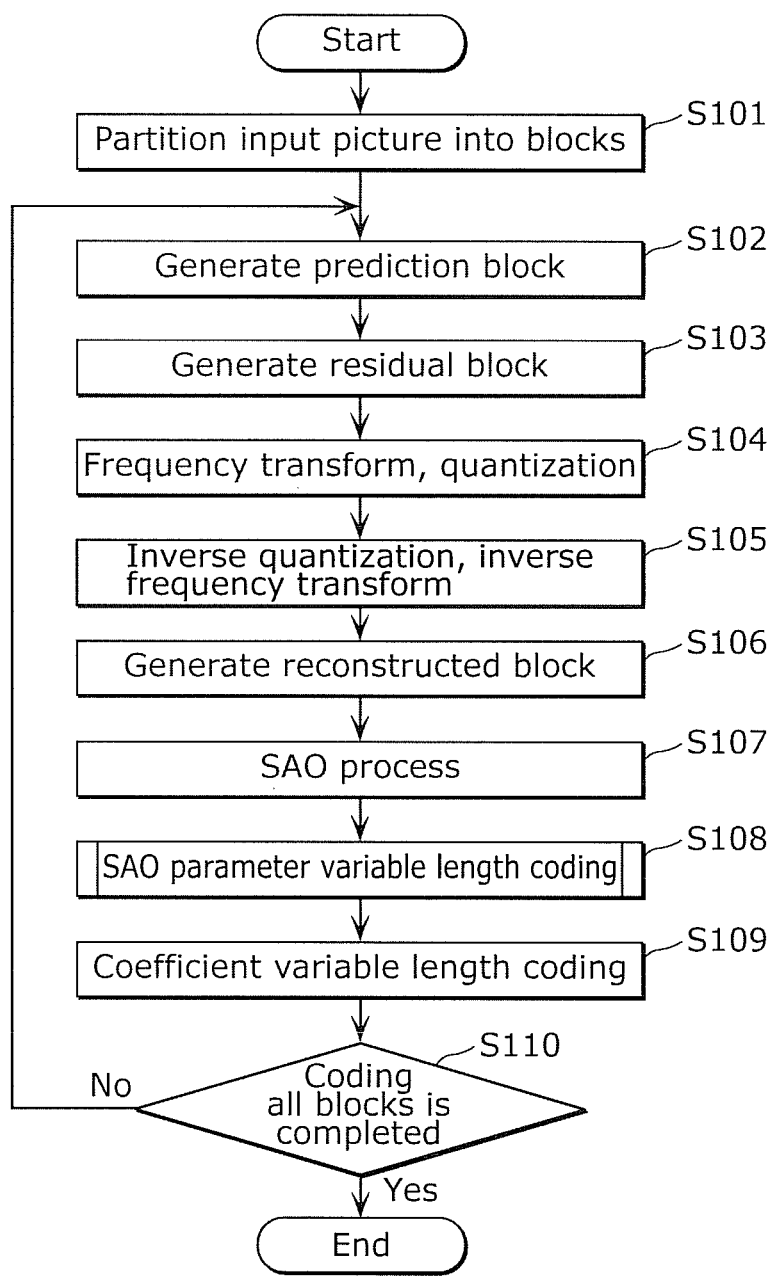
FIG. 2 is a flowchart indicating processes performed by the moving picture coding apparatus according to Embodiment 1.

Next, operations of the moving picture coding apparatus 100 with the configuration will be described. FIG. 2 shows processes performed by the moving picture coding apparatus 100 according to Embodiment 1.

(Step 101)

The block partitioning unit 101 partitions an input picture into blocks (for example, coding units). The block partitioning unit 101 sequentially outputs the blocks to the subtracting unit 103 and the prediction unit 102 as blocks to be coded (input images). The blocks are variable in size. The block partitioning unit 101 partitions the input picture into the blocks, using the features of an image. For example, the minimum size of the blocks is horizontal 4×vertical 4 pixels, and the maximum size of the blocks is horizontal 32×vertical 32 pixels.

(Step 102)

The prediction unit 102 generates a prediction block, based on the blocks to be coded, and a reconstructed picture stored in the frame memory 110 and corresponding to a picture that has already been coded.

(Step 103)

The subtracting unit 103 generates a residual block from each of the blocks to be coded and the prediction block.

(Step 104)

The transform unit 104 transforms the residual block into frequency coefficients. Then, the transform unit 104 quantizes the frequency coefficients.

(Step 105)

The inverse transform unit 105 inversely quantizes the quantized frequency coefficients. Then, the inverse transform unit 105 inversely transforms the inversely-quantized frequency coefficients to reconstruct the residual block.

(Step 106)

The adding unit 106 adds the reconstructed residual block to the prediction block to generate a reconstructed block (reconstructed image). The reconstructed block is sometimes referred to as "local decoded block (local decoded image)".

(Step 107)

The SAO processing unit 107 determines an SAO parameter. Furthermore, the SAO processing unit 107 adds an offset value to at least one pixel value (sample value) included in the reconstructed block, and stores a result of the addition in the frame memory 110. In other words, the SAO processing unit 107 stores, in the frame memory 110, the reconstructed block in which the SAO process has been performed.

More specifically, the SAO processing unit 107 classifies pixels included in the reconstructed block into categories. Then, the SAO processing unit 107 adds, for each of the categories, an offset value corresponding to the category to a pixel value belonging to the category. There are plural methods for classifying pixels. In other words, one of the SAO processes of different types using the methods for classifying pixels is adaptively applied. Thus, the SAO parameter includes a parameter (sao_type_idx) for identifying a type of an SAO process. Furthermore, the SAO parameter also includes a parameter (sao_offset) indicating an offset value.

The SAO process does not always have to be performed.

(Step 108)

The SAO parameter variable length coding unit 108 performs variable length coding (entropy coding) on the SAO parameter to output a bitstream.

(Step 109)

The coefficient variable length coding unit 109 performs variable length coding on the frequency coefficients to output a bitstream.

(Step 110)

The processes from Step 102 to Step 109 are repeated until coding all the blocks in the input picture is completed.

The details of the SAO parameter variable length coding unit 108 and the operation (Step 108) will be hereinafter described.

<Configuration of the SAO Parameter Variable Length Coding Unit>

Figure 3:
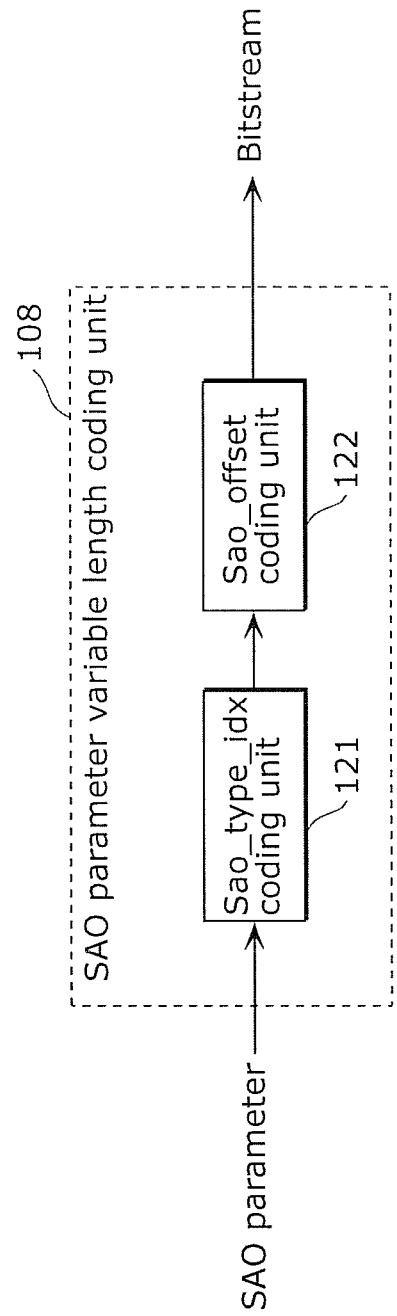
FIG. 3 is a block diagram illustrating an internal configuration of an SAO parameter variable length coding unit according to Embodiment 1.

FIG. 3 illustrates an internal configuration of the SAO parameter variable length coding unit 108 according to Embodiment 1. As illustrated in FIG. 3, the SAO parameter variable length coding unit 108 includes an sao_type_idx coding unit 121 and an sao_offset coding unit 122.

<Operations (SAO Parameter Variable Length Coding)>

Figure 4:
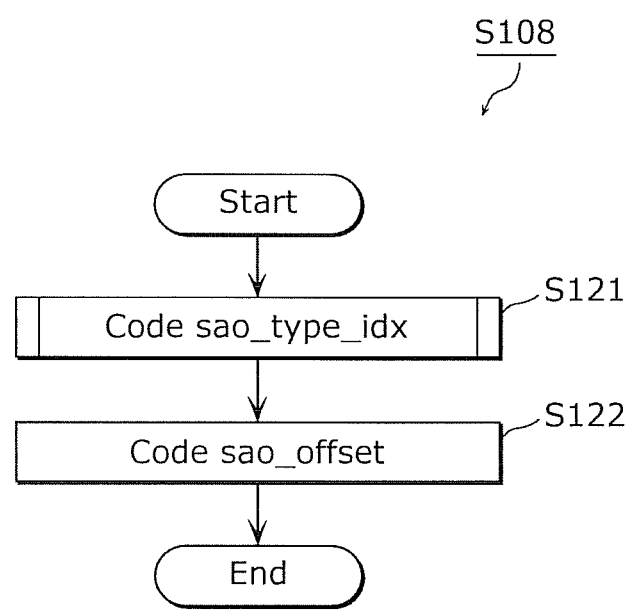
FIG. 4 is a flowchart indicating processes performed by the SAO parameter variable length coding unit according to Embodiment 1.

Next, operations of the SAO parameter variable length coding unit 108 with the configuration will be described. FIG. 4 shows processes performed by the SAO parameter variable length coding unit 108 according to Embodiment 1.

(Step 121)

The sao_type_idx coding unit 121 codes sao_type_idx for identifying a type of an SAO process.

(Step 122)

The sao_offset coding unit 122 codes sao_offset indicating an offset value in the SAO process.

The details of the sao_type_idx coding unit 121 and the operation (Step S121) will be hereinafter described.

<Configuration of the Sao_Type_Idx Coding Unit>

Figure 5:
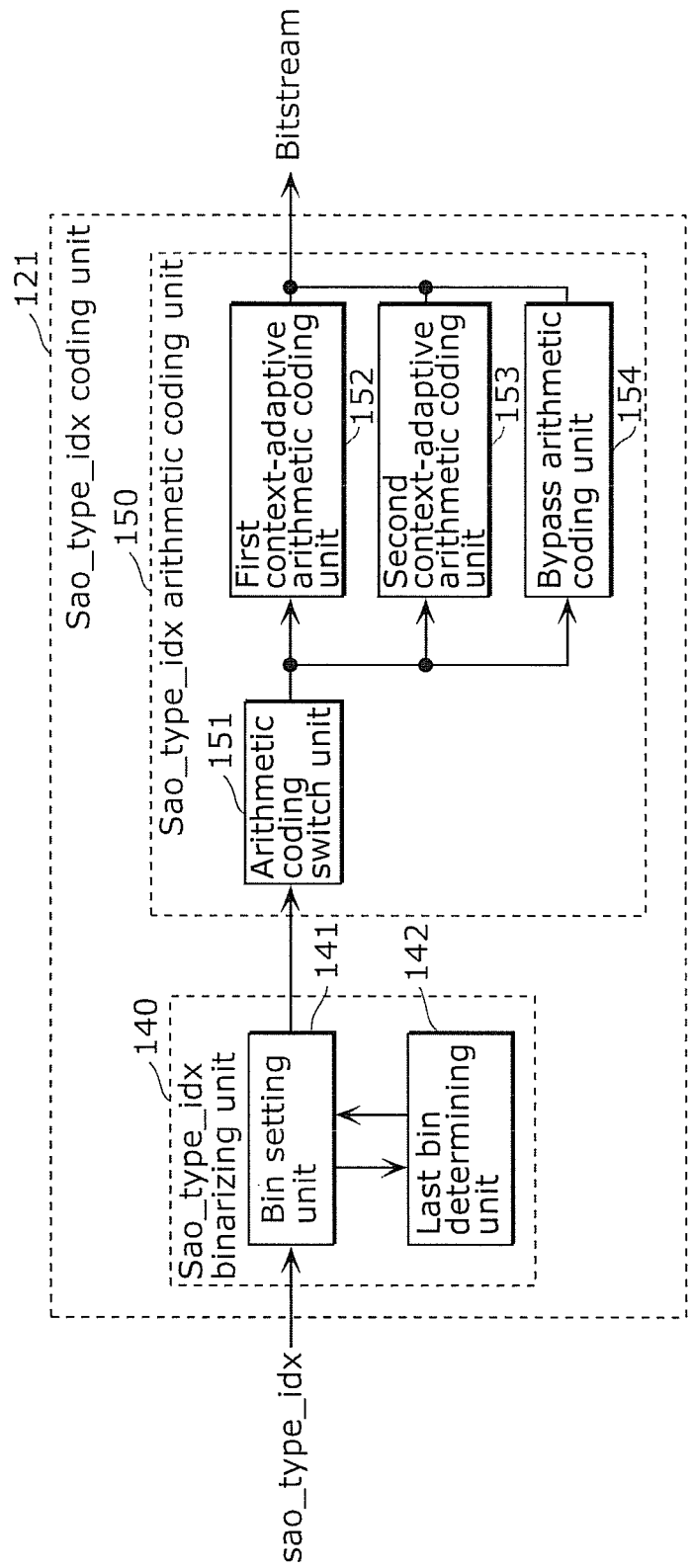
FIG. 5 is a block diagram illustrating an internal configuration of an sao_type_idx coding unit according to Embodiment 1.

FIG. 5 illustrates an internal configuration of the sao_type_idx coding unit 121 according to Embodiment 1. As illustrated in FIG. 5, the sao_type_idx coding unit 121 includes an sao_type_idx binarizing unit 140 and an sao_type_idx arithmetic coding unit 150.

The sao_type_idx binarizing unit 140 converts a value of sao_type_idx into a binary signal. As illustrated in FIG. 5, the sao_type_idx binarizing unit 140 includes a bin setting unit 141 and a last bin determining unit 142.

The sao_type_idx arithmetic coding unit 150 codes at least a portion of the binary signal through bypass arithmetic coding using a fixed probability. As illustrated in FIG. 5, the sao_type_idx arithmetic coding unit 150 includes an arithmetic coding switch unit 151, a first context-adaptive arithmetic coding unit 152, a second context-adaptive arithmetic coding unit 153, and a bypass arithmetic coding unit 154.

<Operations (Sao_Type_Idx Coding)>

Figure 6:
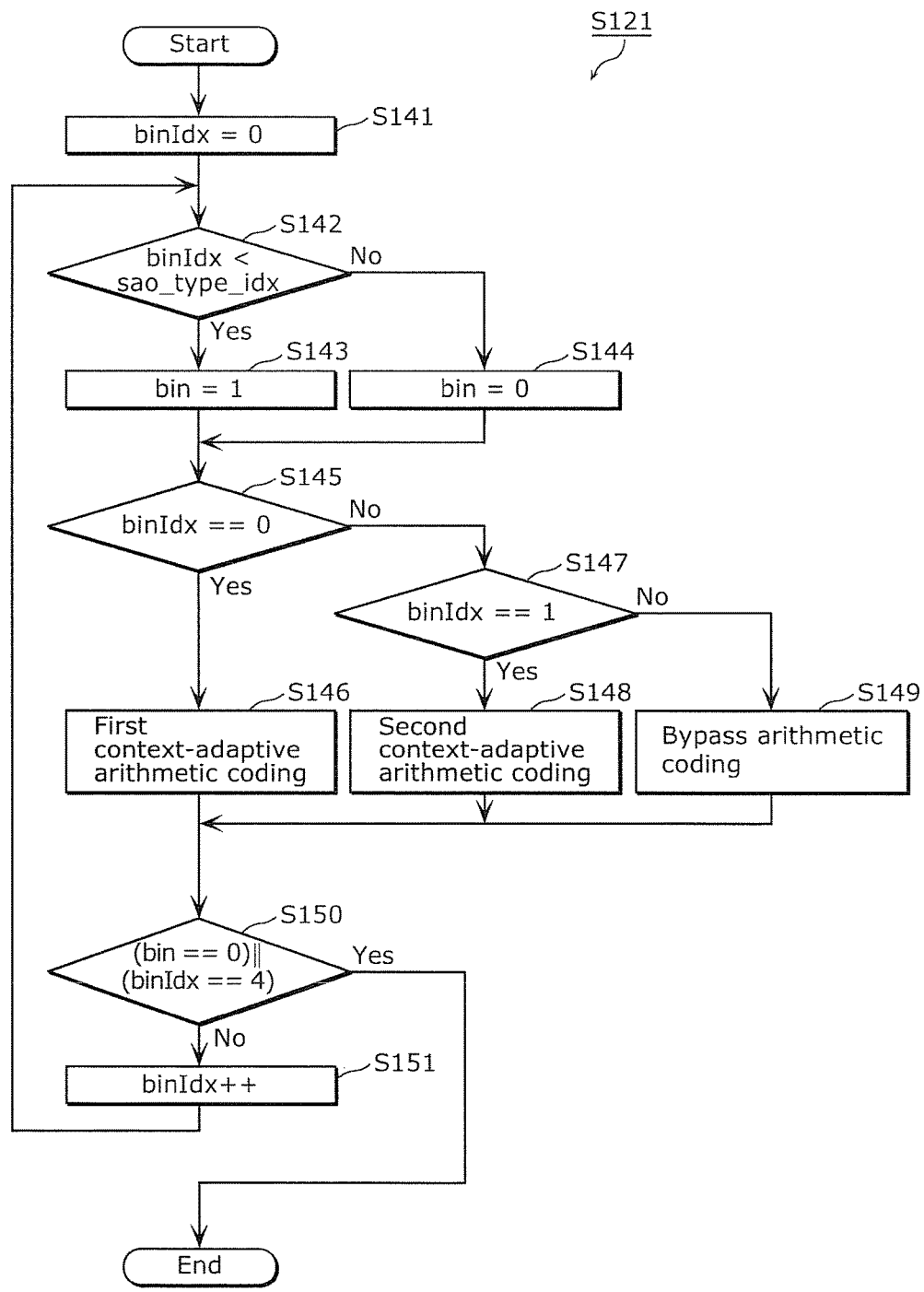
FIG. 6 is a flowchart indicating processes performed by the sao_type_idx coding unit according to Embodiment 1.

Next, details of the operations performed by the sao_type_idx coding unit 121 with the configuration will be described. FIG. 6 shows processes performed by the sao_type_idx coding unit 121 according to Embodiment 1.

(Steps S141 to S144)

The bin setting unit 141 converts a value of sao_type_idx into a binary signal (bin string). More specifically, the bin setting unit 141 sets 0 or 1 to each bin included in the binary signal, using an index (binIdx) for identifying a position of the bin in the binary signal and the value of sao_type_idx. Here, the value of sao_type_idx ranges between 0 and 5 inclusive.

FIG. 7 is a table indicating a correspondence between the non-binary signals (values of sao_type_idx) and the binary signals. As seen from FIG. 7, the number of consecutive "1"s from the beginning of each binary signal is equal to the value indicated by the non-binary signal.

In other words, when the value of sao_type_idx is larger than 0, the binary signal includes one or more first bits having the first symbol "1", where the number of the first bits is equal to the value of sao_type_idx. Furthermore, the binary signal (a) includes one second bit having the second symbol "0" when the value of sao_type_idx is smaller than the maximum value of 5, and (b) does not include the second bit having the second symbol "0" when the value of sao_type_idx is equal to the maximum value.

Furthermore, the first value of a binIdx is 0, and the subsequent values are incremented by 1. The bin and the binIdx are output to the sao_type_idx arithmetic coding unit 150.

(Steps S145 to S149)

The arithmetic coding switch unit 151 switches a processing unit (constituent element) that performs arithmetic coding on a bin, based on the value of the binIdx.

FIG. 8 is a table indicating a correspondence between binIdxs and contexts. According to Embodiment 1, arithmetic coding is performed on a binary signal using two types of contexts (context 0 and context 1) as shown in the column of "Embodiment 1" in the table of FIG. 8.

More specifically, the arithmetic coding switch unit 151 switches to the first context-adaptive arithmetic coding unit 152 when the value of the binIdx is equal to 0. Furthermore, the arithmetic coding switch unit 151 switches to the second context-adaptive arithmetic coding unit 153 when the value of the binIdx is equal to 1. Furthermore, the arithmetic coding switch unit 151 switches to the bypass arithmetic coding unit 154 when the value of the binIdx is equal to neither 0 nor 1.

In other words, the first context-adaptive arithmetic coding unit 152 performs arithmetic coding on a bin of a binIdx having 0, using the context 0. Furthermore, the second context-adaptive arithmetic coding unit 153 performs arithmetic coding on a bin of a binIdx having 1, using the context 1. Furthermore, the bypass arithmetic coding unit 154 performs arithmetic coding on a bin of a binIdx having a value of 2 or higher, using a fixed probability of 50% without using any context.

Here, a set of bins (bins identified by binIdxs having 0 and 1 according to Embodiment 1) coded through the context-adaptive arithmetic coding is referred to as a first portion of a binary signal. Furthermore, a set of bins (bins identified by binIdxs having a value of 2 or higher according to Embodiment 1) coded through the bypass arithmetic coding is referred to as a second portion of the binary signal.

In other words, the first portion of the binary signal is coded through the context-adaptive arithmetic coding according to Embodiment 1. Furthermore, when the binary signal includes the second portion subsequent to the first portion, the second portion of the binary signal is coded through the bypass arithmetic coding.

(Steps S150 and S151)

The last bin determining unit 142 determines whether or not a bin has 0 (first condition) and the binIdx has 4 (second condition). Here, when at least one of the first condition and the second condition is satisfied, coding sao_type_idx is completed.

When none of the first condition and the second condition is satisfied, the last bin determining unit 142 updates the binIdx to a value obtained by adding the value of the binIdx to 1. Then, the processes return to Step S142 to code the next bin.

According to Embodiment 1, when sao_type_idx has the maximum value of 5 as shown in FIG. 7, Steps S150 and S151 can prevent 0 from being added to the last of the binary signal.

Advantages

When sao_type_idx has the maximum value, the code amount can be reduced by preventing 0 from being added to the last of the binary signal according to Embodiment 1. In accordance with the HEVC standard in NPL 1, 5 of sao_type_idx is converted into a binary signal represented by "111110". Since sao_type_idx only takes values from 0 to 5, when the number of consecutive "1" s in a binary signal is five ("11111"), the decoding apparatus recognizes sao_type_idx as 5. Thus, when sao_type_idx is equal to the maximum value of 5, the code amount can be reduced by preventing 0 from being added to the last of the binary signal according to Embodiment 1.

Furthermore, determining the maximum number of bins included in the binary signal of sao_type_idx as 5 increases error tolerance of the decoding apparatus. More specifically, when an abnormal bitstream (binary signal in which consecutive "1"s are endless) is decoded, conventionally, the decoding processing does not end due to no appearance of 0. However, determining the maximum number of bins to 5 enables completion of the decoding processing even when 0 does not appear in the binary signal.

Furthermore, performing the bypass arithmetic coding on bins that are in a latter half of the binary signal and obtained from the values of sao_type_idx enables acceleration of the arithmetic coding or reduction in the load for the arithmetic coding. According to Embodiment 1, bins of a binIdx having a value of 2 or higher are coded not through the context-adaptive arithmetic coding but through the bypass arithmetic coding. As described above, the bypass arithmetic coding does not require loading or updating a context, and the processing can be started without waiting for completion of updating the context at the prior stages. Thus, the processing can be accelerated or the processing load can be reduced more than the context-adaptive arithmetic coding.

Furthermore, in accordance with the HEVC standard in NPL 1, the context-adaptive arithmetic coding is performed on a bin of a binIdx having a value of 1 or higher, using the same context. This is because symbol occurrence probabilities (probabilities of occurrence of 1) of the bin of the binIdx having a value of 1 or higher are almost the same, but are not equal to 50% and have a bias. In other words, when a binary signal includes a bin whose binIdx is 1 or higher (value of sao_type_idx is 1 or higher), there are many cases where (a) the bin whose binIdx is 1 has 0 and the binary signal does not include a bin whose binIdx is 2 or higher (value of sao_type_idx is 1) and (b) no bin having 0 appears up to the bin of the binIdx having a larger value (value of sao_type_idx is 4 or 5, etc).

However, the experiment in which arithmetic coding is performed on a bin whose binIdx is 2 or higher with a fixed symbol occurrence probability of 50% revealed that the coding efficiency is hardly degraded. Specifically, it revealed that the value of sao_type_idx often indicates a medium value (2 or 3, etc) and the symbol occurrence probability of the bin whose binIdx is 2 or higher is closer to 50%. Thus, coding a bin whose binIdx is 2 or higher not through the context-adaptive arithmetic coding but through the bypass arithmetic coding enables accelerated processing or reduction in the processing load while suppressing decrease in the coding efficiency.

Although the bypass arithmetic coding is performed on a bin whose binIdx is 2 or higher according to Embodiment 1, the processing is not limited to such. For example, a bin whose binIdx is 1 or higher may be coded through the bypass arithmetic coding (Variation 1). For example, all the bins included in a binary signal may be coded through the bypass arithmetic coding (Variation 2).

As shown in FIG. 8, a bin whose binIdx is 1 or higher may be coded through the bypass arithmetic coding according to Variation 1. In other words, the first portion of a binary signal coded through the context-adaptive arithmetic coding is composed of the first bin of the binary signal. Furthermore, the second portion of a binary signal coded through the bypass arithmetic coding is composed of the remaining bins of the binary signal. Furthermore, all the bins are coded through the bypass arithmetic coding according to Variation 2.

Hereinafter, the result of experiment according to Embodiment 1 and Variations 1 and 2 will be described. The test software in accordance with the HEVC standard in which a method for performing bypass arithmetic coding on a bin whose binIdx is 2 or higher (Embodiment 1), a method for performing bypass arithmetic coding on a bin whose binIdx is 1 or higher (Variation 1), and a method for performing bypass arithmetic coding on all of the bins (Variation 2) were adapted was used in the experiment.

FIG. 9 is a table showing a result of the experiment in which the coding efficiencies between the conventional technique and Embodiment 1 and Variations 1 and 2 are compared. The experiment conditions follow the common experiment conditions of the HEVC standard organization. The values of FIG. 9 are results on the first 49 frames in a test image. The larger the value is, the lower the coding efficiency is. The negative value indicates improvement in the coding efficiency in comparison with the conventional technique (NPL1).

As illustrated in FIG. 9, the values range between −0.1 and 0.1% under all of the conditions, according to Embodiment 1 and Variation 1. In other words, the coding efficiency hardly changes irrespective of the accelerated processing by the bypass arithmetic coding according to Embodiment 1 and Variation 1.

Furthermore, although the coding efficiency of Variation 2 is lower than those of Embodiment 1 and Variation 1, the values are within 1%. Furthermore, the coding efficiency hardly decreases under a condition AI in which all of the frames are intra-coded.

Thus, the coding method according to Variation 2 may be used when the accelerated processing is prioritized even with slight reduction in the coding efficiency and intra-coding is frequently applied. Otherwise, moving pictures may be coded in the coding methods according to Embodiment 1 and Variation 1.

Here, a bin whose binIdx is 2 or lower may be coded through the context-adaptive arithmetic coding, and a bin whose binIdx is 3 or higher may be coded through the bypass arithmetic coding.

Although Embodiment 1 uses sao_type_idx for identifying a type of an SAO process and sao_offset indicating a value of an SAO offset value as SAO parameters, the SAO parameters are not limited to such. The SAO parameters may include, for example, a parameter indicating auxiliary information for classifying pixels. Furthermore, the SAO parameters may include sao_offset_sign representing a sign bit (positive and negative) of sao_offset.

Furthermore, sao_type_idx may include information indicating no execution of any SAO process. For example, when the value of sao_type_idx is equal to 0, the SAO process does not always have to be performed on a reconstructed block.

Furthermore, although the SAO parameter is coded per block according to Embodiment 1, the coding is not limited to such. The SAO parameter may be coded on a per unit smaller than the block. Conversely, the SAO parameter may be coded on a per unit obtained by concatenating blocks. Furthermore, the SAO parameter is not coded in a current block, but instead, a value of an SAO parameter of another block may be copied and used.

Furthermore, although sao_type_idx takes values from 0 to 5 according to Embodiment 1, the values are not limited to such. The maximum value of sao_type_idx may be 6 or higher, or 4 or lower.

For example, the following will describe a case where the maximum value of sao_type_idx is 2. In other words, the case where the number of types of SAO processes is three.

FIG. 10 is a table indicating a correspondence between non-binary signals (sao_type_idx) and binary signals according to Variation 3. Furthermore, FIG. 11 is a table indicating a correspondence between binIdxs and a context according to Variation 3.

For example, when the value of sao_type_idx is equal to 0, the SAO process is not applied to a reconstructed block according to Variation 3. Furthermore, when the value of sao_type_idx is equal to 1, a first SAO process is applied to the reconstructed block. Furthermore, when the value of sao_type_idx is equal to 2, a second SAO process is applied to the reconstructed block.

The first SAO process is, for example, a band offset process. Furthermore, the second SAO process is, for example, an edge offset process. In the edge offset process, a category to which each of pixels belongs is determined, based on a difference between a pixel value of the pixel and a pixel value of a pixel adjacent to the pixel. Furthermore, in the band offset process, a range of possible pixel values is divided into bands, and a category to which each of the pixels belongs is determined based on the band to which the pixel value of the pixel belongs. Since NPL1 and others disclose the details of the edge offset process and the band offset process, the details are omitted herein.

As shown in FIGS. 10 and 11, the first bin (binIdx=0, the first portion) of a binary signal is coded through the context-adaptive arithmetic coding according to Variation 3. Furthermore, the remaining bins (binIdx=1, the second portion) of the binary signal are coded through the bypass arithmetic coding.

Here, only when the value of sao_type_idx is equal to 0, the first bin has 0. Otherwise, the first bin has 1. In other words, the first portion of a binary signal indicates whether or not the value of sao_type_idx is equal to a predetermined value of 0. In other words, the first portion of the binary signal indicates whether or not the SAO process is applied to a reconstructed block. As such, a portion indicating whether or not the SAO process is applied to a reconstructed block is coded through the context-adaptive arithmetic coding, and (ii) the other portions are coded through the bypass arithmetic coding. These processes enable accelerated processing or reduction in the processing load while suppressing decrease in the coding efficiency.

The coding methods according to Embodiment 1 and Variations 1 to 3 may be applied not only to sao_type_idx but to the other syntaxes that are added to a bitstream. Accordingly, the processing performed by a variable length coding unit can be standardized.

The bypass arithmetic coding may be performed on a second portion of a binary signal corresponding to, for example, sao_offset indicating an SAO offset value, ref_idx indicating an index of a reference image, merge_idx for identifying a candidate to be used in inter prediction from a list of candidates each including at least one motion vector, or mpm_idx or intra_chroma_pred_mode for identifying an intra prediction mode. Since NPL1 discloses sao_offset, ref_idx, merge_idx, mpm_idx, and intra_chroma_pred_mode, the details are omitted herein.

In other words, the bit length of the first portion of the first binary signal may be identical to the bit length of the first portion of the second binary signal. Here, the first binary signal is a binary signal obtained by binarizing a value of a parameter (sao_type_idx) for identifying a type of a sample offset process. Furthermore, the second binary signal is a binary signal obtained by binarizing at least one of (i) a parameter (for example, intra_chroma_pred_mode) for identifying an intra prediction mode and (ii) a parameter (for example, merge_idx) for identifying a candidate to be used in inter prediction from a list of candidates each including at least one motion vector.

As such, standardizing, for sao_type_idx and the other syntaxes, a portion on which the bypass arithmetic coding is performed enables not only the accelerated processing, but also the simplification of the configuration of an apparatus with the common use of a variable length coding unit.

Furthermore, although the minimum size of the blocks is 4×4 pixels and the maximum size of the blocks is 32×32 pixels, the sizes are not limited to such. Furthermore, the size of the blocks does not have to be variable and may be fixed.

Furthermore, the sample offset process is not limited to the SAO process described in NPL1. In other words, the sample offset process may be any process as long as a sample value (pixel value) of a reconstructed image is offset.

Embodiment 2

Next, Embodiment 2 will be described. Embodiment 2 will describe decoding an image coded in the moving picture coding method according to Embodiment 1. In particular, Embodiment 2 will describe performing arithmetic decoding on a parameter that is coded according to Embodiment 1 and is for identifying a type of a sample offset process.

<Overall Configuration>

Figure 12:
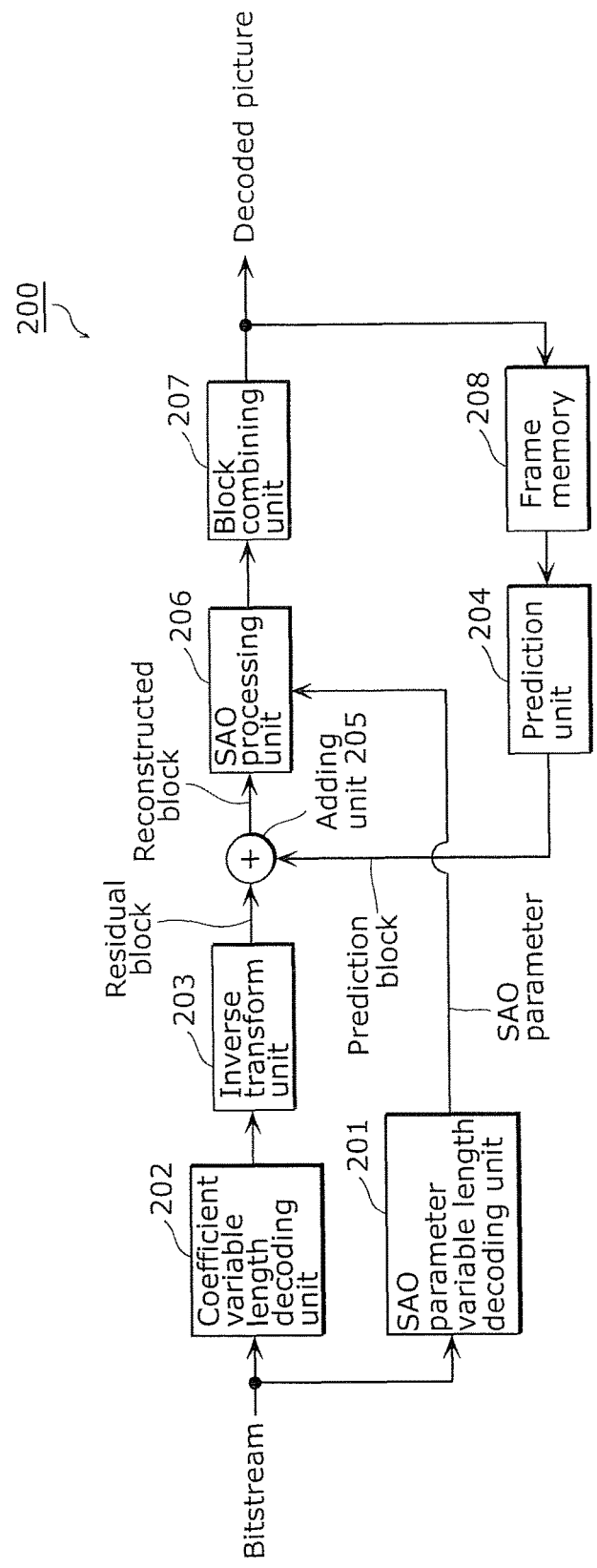
FIG. 12 is a block diagram illustrating a configuration of a moving picture decoding apparatus according to Embodiment 2.

FIG. 12 illustrates a configuration of a moving picture decoding apparatus 200 according to Embodiment 2. The moving picture decoding apparatus 200 decodes a coded picture per block.

As illustrated in FIG. 12, the moving picture decoding apparatus 200 includes an SAO parameter variable length decoding unit 201, a coefficient variable length decoding unit 202, an inverse transform unit 203, a prediction unit 204, an adding unit 205, an SAO processing unit 206, a block combining unit 207, and a frame memory 208.

<Overall Operations>

Figure 13:
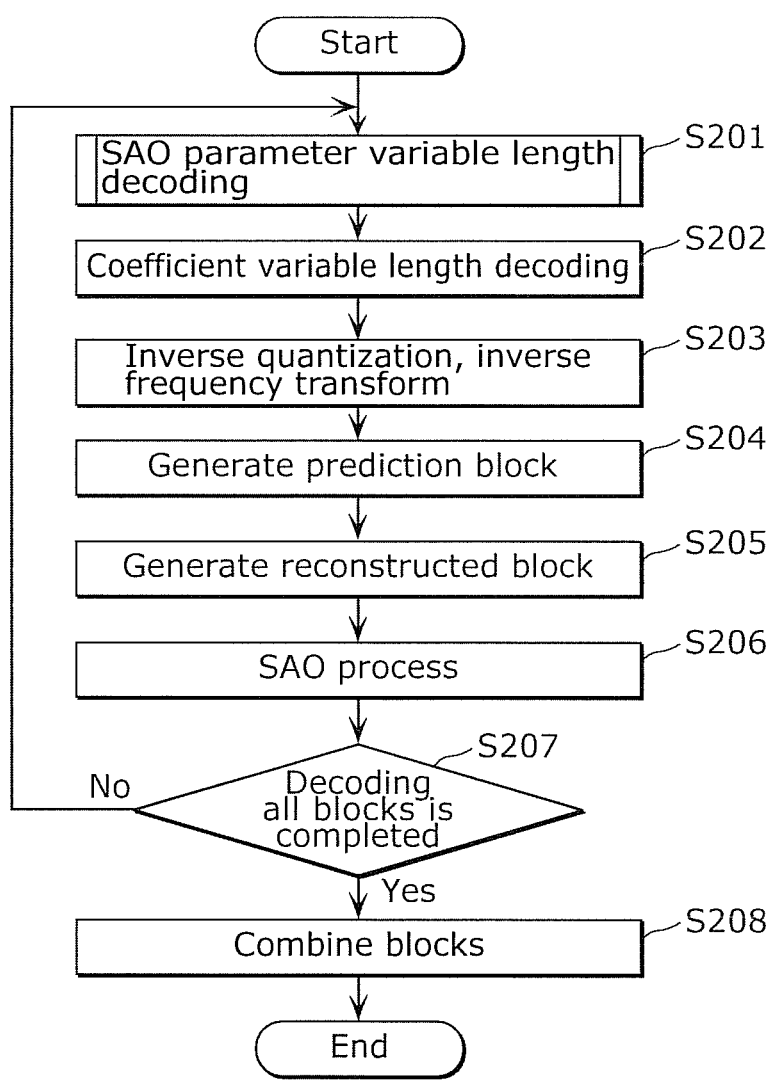
FIG. 13 is a flowchart indicating processes performed by the moving picture decoding apparatus according to Embodiment 2.

Next, operations of the moving picture decoding apparatus 200 with the configuration will be described. FIG. 13 shows processes performed by the moving picture decoding apparatus 200 according to Embodiment 2.

(Step 201)

The SAO parameter variable length decoding unit 201 performs variable length decoding (entropy decoding) on a coded SAO parameter included in a bitstream.

(Step 202)

The coefficient variable length decoding unit 202 performs variable length decoding on coded frequency coefficients included in the bitstream to output the frequency coefficients to the inverse transform unit 203.

(Step 203)

The inverse transform unit 203 inversely transforms the frequency coefficients into pixel data to generate a residual block.

(Step 204)

The prediction unit 204 generates a prediction block, based on a picture that is stored in the frame memory 208 and has already been decoded.

(Step 205)

The adding unit 205 adds the residual block to the prediction block to generate a reconstructed block.

(Step 206)

The SAO processing unit 206 classifies pixels included in the reconstructed block into categories, according to the SAO parameter. Then, the SAO processing unit 206 adds a corresponding offset value for each of the categories. In other words, the SAO processing unit 206 applies the SAO process to the reconstructed block using the SAO parameter. Here, the SAO parameters include a parameter (sao_type_idx) for identifying a type of an SAO process and a parameter (sao_offset) indicating an offset value.

The SAO process does not always have to be performed. For example, when the value of sao_type_idx is equal to a predetermined value, the SAO process does not have to be performed.

(Step 207)

The processes from Steps S201 to S206 are repeated until processing on all the blocks included in the picture to be decoded is completed.

(Step 208)

The block combining unit 207 combines the bocks to generate a decoded picture. Furthermore, the block combining unit 207 stores the decoded picture in the frame memory 208.

The details of the SAO parameter variable length decoding unit 201 and the process (Step 201) will be hereinafter described.

<Configuration of the SAO Parameter Variable Length Decoding Unit>

Figure 14:
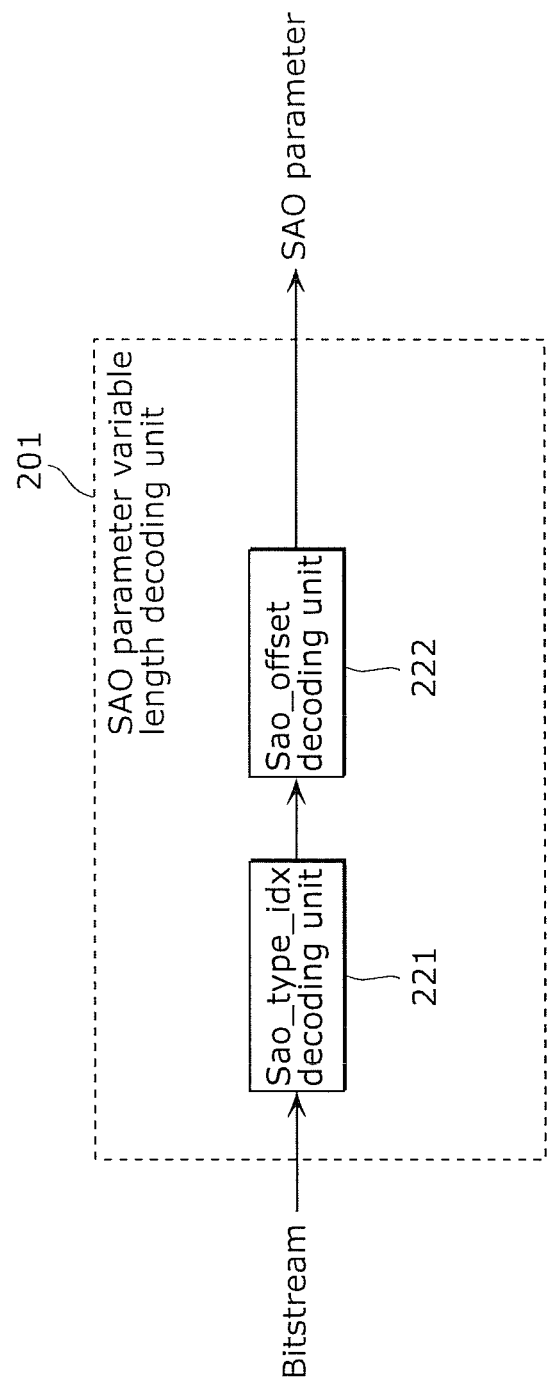
FIG. 14 is a block diagram illustrating an internal configuration of an SAO parameter variable length decoding unit according to Embodiment 2.

FIG. 14 illustrates an internal configuration of the SAO parameter variable length decoding unit 201 according to Embodiment 2. As illustrated in FIG. 14, the SAO parameter decoding unit 201 includes an sao_type_idx decoding unit 221 and an sao_offset decoding unit 222.

<Operations (SAO Parameter Variable Length Decoding)>

Figure 15:
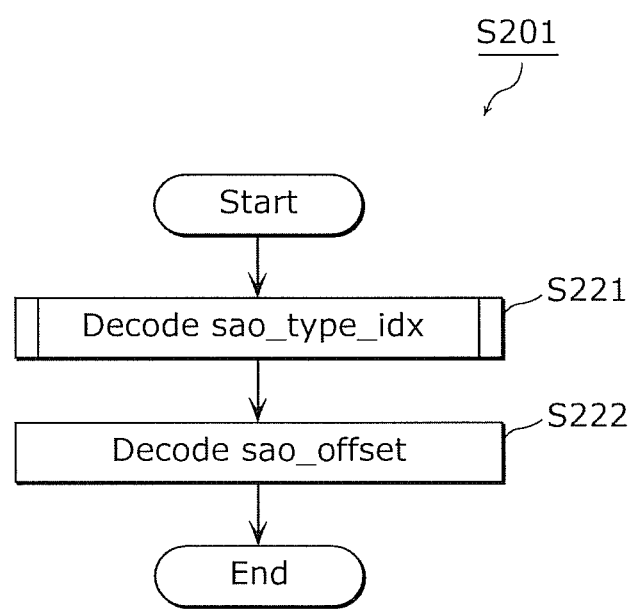
FIG. 15 is a flowchart indicating processes performed by the SAO parameter variable length decoding unit according to Embodiment 2.

Next, operations of the SAO parameter variable length decoding unit 201 with the configuration will be described. FIG. 15 shows processes performed by the SAO parameter variable length decoding unit 201 according to Embodiment 2.

(Step 221)

The sao_type_idx decoding unit 221 decodes coded sao_type_idx.

(Step 222)

The sao_offset decoding unit 222 decodes coded sao_offset.

The details of the sao_type_idx decoding unit 221 and the operation (Step S221) will be hereinafter described.

<Configuration of the Sao_Type_Idx Decoding Unit>

Figure 16:
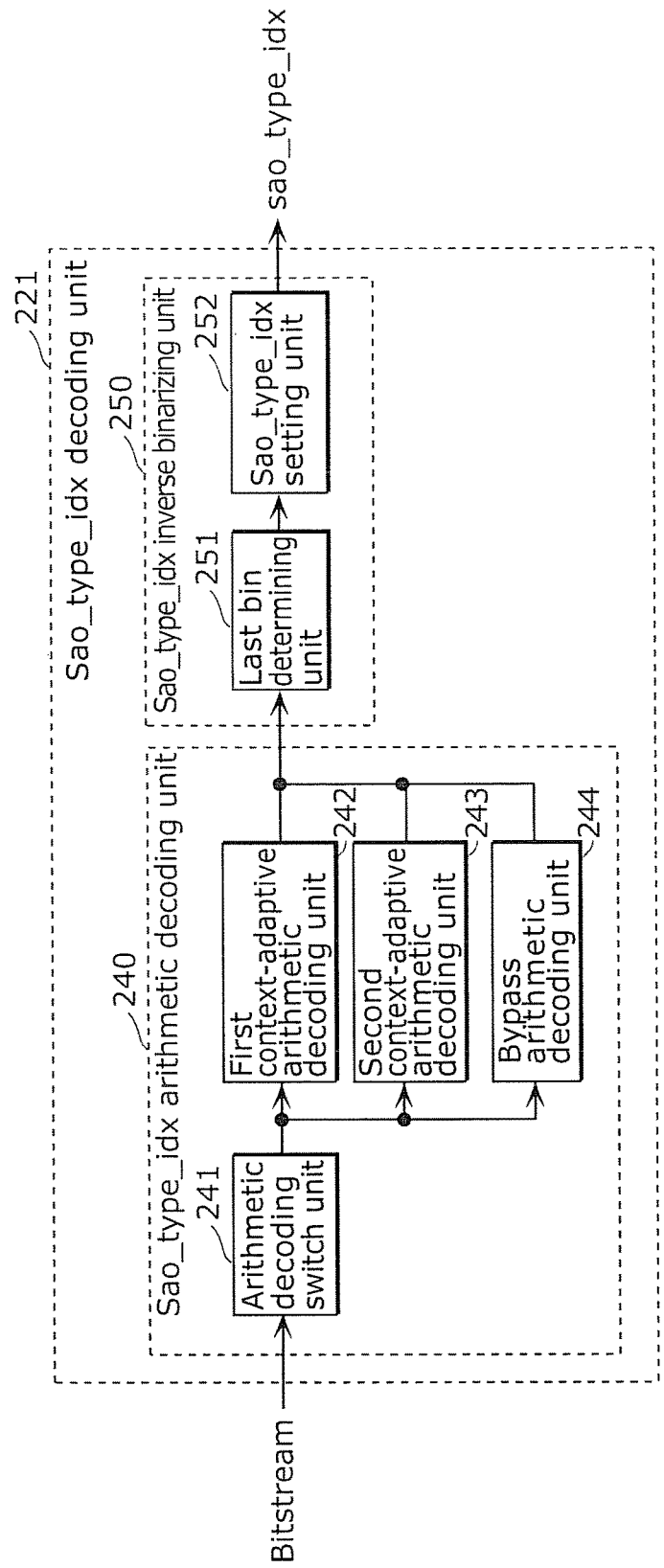
FIG. 16 is a block diagram illustrating an internal configuration of an sao_type_idx decoding unit according to Embodiment 2.

FIG. 16 illustrates an internal configuration of the sao_type_idx decoding unit 221 according to Embodiment 2. As illustrated in FIG. 16, the sao_type_idx decoding unit 221 includes an sao_type_idx arithmetic decoding unit 240 and an sao_type_idx inverse binarizing unit 250.

The sao_type_idx arithmetic decoding unit 240 decodes at least a coded portion of a binary signal corresponding to sao_type_idx for identifying a type of an SAO process to be applied to a reconstructed block, through bypass arithmetic decoding. As illustrated in FIG. 16, the sao_type_idx arithmetic decoding unit 240 includes an arithmetic decoding switch unit 241, a first context-adaptive arithmetic decoding unit 242, a second context-adaptive arithmetic decoding unit 243, and a bypass arithmetic decoding unit 244.

The sao_type_idx inverse binarizing unit 250 converts the decoded binary signal into the value of sao_type_idx. As illustrated in FIG. 16, the sao_type_idx inverse binarizing unit 250 includes a last bin determining unit 251 and an sao_type_idx setting unit 252.

<Operations (Sao_Type_Idx Decoding)>

Figure 17:
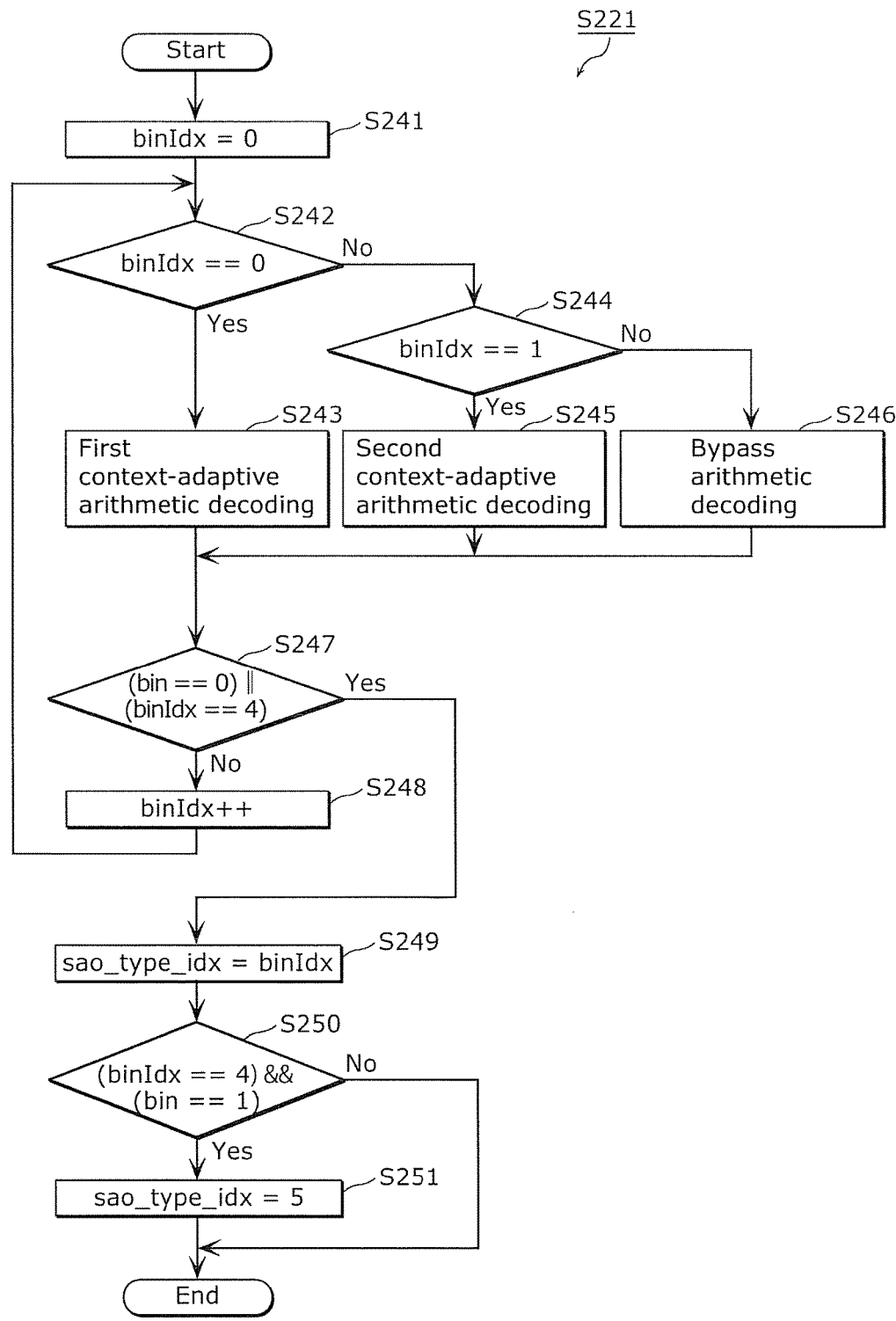
FIG. 17 is a flowchart indicating processes performed by the sao_type_idx decoding unit according to Embodiment 2.

Next, details of the operations performed by the sao_type_idx decoding unit 221 with the configuration will be described. FIG. 17 shows processes performed by the sao_type_idx decoding unit 221 according to Embodiment 2.

(Step S241 to S246)

The arithmetic decoding switch unit 241 determines a value of a binIdx of a bin to be processed. Then, the arithmetic decoding switch unit 241 switches a processing unit (constituent element) that performs arithmetic decoding on a coded bin, based on the determined value of the binIdx. More specifically, the arithmetic decoding switch unit 241 switches to the first context-adaptive arithmetic decoding unit 242 when the value of the binIdx is equal to 0. More specifically, the arithmetic decoding switch unit 241 switches to the second context-adaptive arithmetic decoding unit 243 when the value of the binIdx is equal to 1. Furthermore, the arithmetic decoding switch unit 241 switches to the bypass arithmetic decoding unit 244 when the value of the binIdx is equal to neither 0 nor 1.

In other words, the first context-adaptive arithmetic decoding unit 242 performs arithmetic decoding on a coded bin of the binIdx having 0, using the context 0. Furthermore, the second context-adaptive arithmetic decoding unit 243 performs arithmetic decoding on a coded bin of the binIdx having 1, using the context 1. Furthermore, the bypass arithmetic coding unit 244 performs arithmetic decoding on a bin of the binIdx having a value of 2 or higher, using a fixed probability of 50% without using any context.

Here, a set of bins (bins identified by binIdxs having 0 and 1 according to Embodiment 2) coded through the context-adaptive arithmetic coding is referred to as a first portion of a binary signal. Furthermore, a set of bins (bins identified by binIdxs each having a value of 2 or higher according to Embodiment 2) coded through the bypass arithmetic coding is referred to as a second portion of the binary signal.

In other words, the coded first portion of the binary signal is decoded through the context-adaptive arithmetic decoding according to Embodiment 2. Furthermore, when the binary signal includes the second portion subsequent to the first portion, the coded second portion of the binary signal is decoded through the bypass arithmetic decoding.
(Steps S247 and S248)

When the bin resulting from the arithmetic decoding is 0 or the value of the binIdx is equal to 4, the last bin determining unit 251 completes the arithmetic decoding on the coded bin, and the processes proceed to Step S249. When the value of the bin is equal to 1 and the value of the binIdx is 3 or lower, the last bin determining unit 251 adds 1 to the value of the binIdx, and the processes proceed to Step S242.
(Steps S249 to S251)

The sao_type_idx setting unit 252 sets the value of the binIdx to sao_type_idx. Furthermore, when the value of the binIdx is equal to 4 and the value of the bin is 1, the sao_type_idx setting unit 252 sets 5 to sao_type_idx. With Steps S249 to S251, a binary signal can be converted into 5 that is the value of sao_type_idx even when no 0 is at the end of the binary signal. The correspondence between the non-binary signals and the binary signals is the same as shown in FIG. 7 according to Embodiment 1.
<Advantages>

According to Embodiment 2, sao_type_idx coded in Embodiment 1 can be decoded. In other words, at least a coded portion of a binary signal corresponding to a value of sao_type_idx can be decoded through the bypass arithmetic decoding. Thus, the same advantages as those according to Embodiment 1 can be produced. For example, processing can be accelerated or the processing load can be reduced while decrease in the coding efficiency can be suppressed.

Thus, the same variations as those according to Embodiment 1 can be applied to Embodiment 2. In other words, the coded sao_type_idx may be decoded as shown in FIGS. 8, 10, and 11 according to Variations 1 to 3.

Furthermore, the bypass arithmetic decoding may be performed on the coded second portion of a binary signal corresponding to, for example, sao_offset indicating an SAO offset value, ref_idx indicating an index of a reference image, merge_idx for identifying a candidate to be used in inter prediction from a list of candidates each including at least one motion vector, or mpm_idx or intra_chroma_pred_mode for identifying an intra prediction mode, also in Embodiment 2. In other words, the bit length of the first portion of the first binary signal may be identical to the bit length of the first portion of the second binary signal.

Although the moving picture coding apparatus and the moving picture decoding apparatus according to one or more aspects of the present disclosure are described based on Embodiments 1 and 2, the present disclosure is not limited to these Embodiments. Without departing from the scope of the present disclosure, the aspects of the present disclosure may include an embodiment with some modifications on Embodiments that are conceived by a person skilled in the art, and another embodiment obtained through combinations of the constituent elements of different Embodiments.

For example, the moving picture coding apparatus neither have to include a part of the constituent elements in FIG. 1 nor perform a part of Steps in FIG. 2. Furthermore, the moving picture decoding apparatus neither have to include a part of the constituent elements in FIG. 12 nor perform a part of Steps in FIG. 13. One of the examples of such moving picture coding apparatus and moving picture decoding apparatus will be described hereinafter.

Figure 18A:
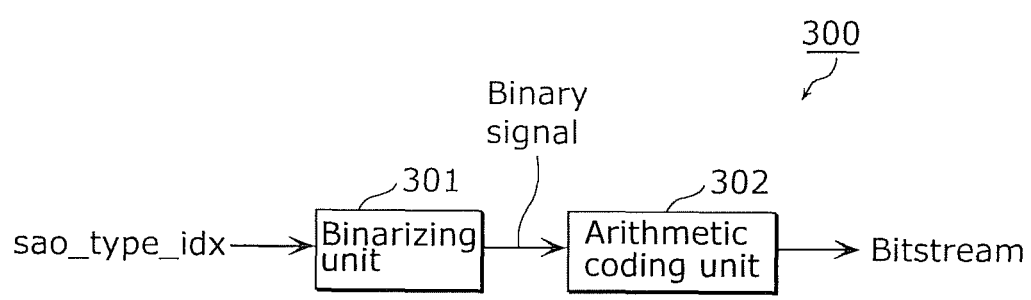
FIG. 18A is a block diagram illustrating a configuration of a moving picture coding apparatus according to another Embodiment.
Figure 18B:
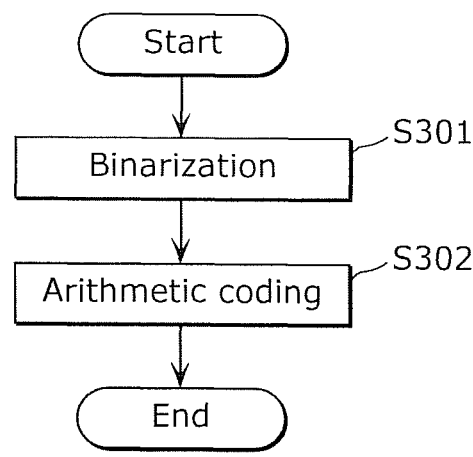
FIG. 18B is a flowchart indicating processes performed by the moving picture coding apparatus according to the other Embodiment.

FIG. 18A illustrates a configuration of a moving picture coding apparatus 300 according to another Embodiment. Furthermore, FIG. 18B shows processes performed by the moving picture coding apparatus 300 according to the other Embodiment.

The moving picture coding apparatus 300 includes a binarizing unit (binarizer) 301 and an arithmetic coding unit (arithmetic coder) 302.

The binarizing unit 301 corresponds to the sao_type_idx binarizing unit 140 according to Embodiment 1. The binarizing unit 301 converts a value of a parameter for identifying a type of a sample offset process into a binary signal (S301).

The arithmetic coding unit 302 corresponds to the sao_type_idx arithmetic coding unit 150 according to Embodiment 1. The arithmetic coding unit 302 codes at least a portion of a binary signal through bypass arithmetic coding using a fixed probability (S302).

Since the moving picture coding apparatus 300 can code at least a portion of a binary signal corresponding to a parameter for identifying a type of a sample offset process, through bypass arithmetic coding, processing can be accelerated or the processing load can be reduced while decrease in the coding efficiency can be suppressed.

Figure 19A:
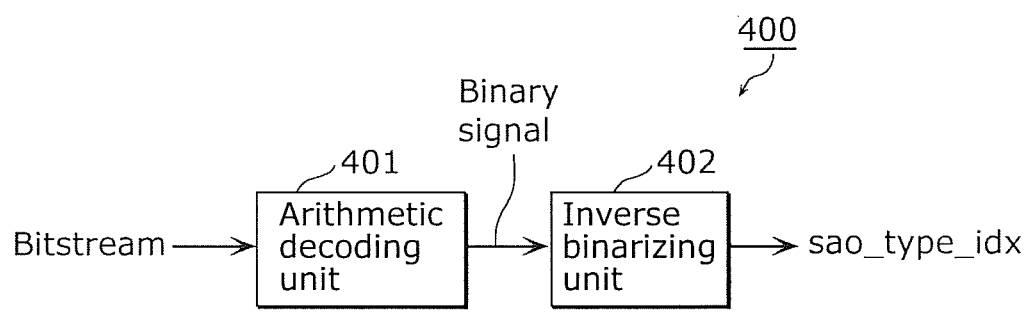
FIG. 19A is a block diagram illustrating a configuration of a moving picture decoding apparatus according to the other Embodiment.
Figure 19B:
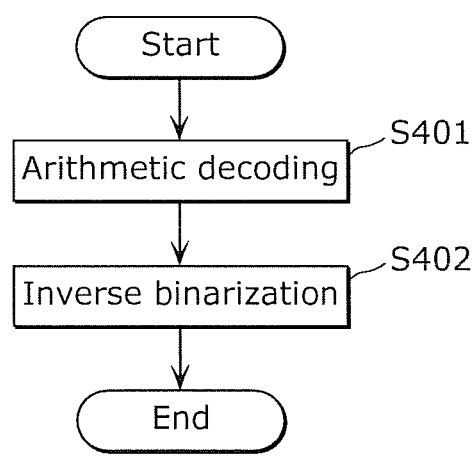
FIG. 19B is a flowchart indicating processes performed by the moving picture decoding apparatus according to the other Embodiment.

FIG. 19A illustrates a configuration of a moving picture decoding apparatus 400 according to the other Embodiment. Furthermore, FIG. 19B shows processes performed by the moving picture decoding apparatus 400 according to the other Embodiment.

The moving picture decoding apparatus 400 includes an arithmetic decoding unit (arithmetic decoder) 401 and an inverse binarizing unit (inverse binarizer) 402.

The arithmetic decoding unit 401 corresponds to the sao_type_idx arithmetic decoding unit 240 according to Embodiment 2. The arithmetic decoding unit 401 decodes at least a coded portion of a binary signal corresponding to a parameter for identifying a type of a sample offset process to be applied to a reconstructed block obtained from a coded image, through bypass arithmetic decoding (S401).

The inverse binarizing unit 402 corresponds to the sao_type_idx inverse binarizing unit 250 according to Embodiment 2. The inverse binarizing unit 402 converts the decoded binary signal into a value of the parameter for identifying the type of the sample offset process (S402).

Since the moving picture decoding apparatus 400 can decode at least a coded portion of a binary signal corresponding to a parameter for identifying a type of a sample offset process, through bypass arithmetic decoding, processing can be accelerated or the processing load can be reduced while decrease in the coding efficiency can be suppressed.

In general, in each of Embodiments, each of the functional blocks may be implemented by, for example, an MPU and a memory. Furthermore, in general, the processing by each of the functional blocks may be implemented by software (a program), and such software is recorded on a recording medium such as a ROM. In addition, such software may be distributed by, for example, downloading and recording it on recording media such as CD-ROMs. Each of the functional blocks may be implemented by hardware (a dedicated circuit).

The processing described in each of Embodiments may be performed as centralized processing by a single apparatus (system) or may be performed as decentralized processing by a plurality of apparatuses. Here, the program may be executed by one or more computers. In other words, any one of the centralized processing and the decentralized processing may be performed.

Furthermore, each of the constituent elements according to each of Embodiments 1 and 2 may be implemented by dedicated hardware or by executing a software program appropriate for the constituent element. Each of the constituent elements may be implemented by a program executing unit, such as a central processing unit (CPU) and a processor, reading and executing the software program recorded on a recording medium, such as a hard disk or a semiconductor memory.

Specifically, each of the moving picture coding apparatus and the moving picture decoding apparatus includes control circuitry and storage electrically connected to (capable of accessing from) the control circuitry. The control circuitry may include at least one of the dedicated hardware and the program executing unit. Furthermore, when the control circuitry includes the program executing unit, the storage may store the software program executed by the program executing unit.

Here, the software that implements the moving picture coding apparatus and the moving picture decoding apparatus according to each of Embodiments 1 and 2 is the following program.

Specifically, the program causes a computer to execute a moving picture coding method for coding an input image, the method including: converting a value of a first parameter into a first binary signal, the first parameter identifying a type of a sample offset process to be applied to a reconstructed image corresponding to the input image; and coding at least a portion of the first binary signal through bypass arithmetic coding using a fixed probability.

Furthermore, the program causes a computer to execute a moving picture decoding method for decoding a coded image, the method including: decoding at least a coded portion of a first binary signal through bypass arithmetic decoding using a fixed probability, the first binary signal corresponding to a value of a first parameter identifying a type of a sample offset process to be applied to a reconstructed image obtained from the coded image; and converting the decoded first binary signal into the value of the first parameter.

Embodiment 3

An independent computer system can easily perform processing described in each of Embodiments by recording, in a recording medium, a program for implementing the structure of the moving picture coding method (image coding method) or the moving picture decoding method (image decoding method) according to Embodiment. The recording medium may be any as long as the program can be recorded thereon, such as a magnetic disk, an optical disk, an optical magnetic disk, an IC card, and a semiconductor memory.

Hereinafter, applications of the moving picture coding method (image coding method) and the moving picture decoding method (image decoding method) according to each of Embodiments, and a system using such applications will be described. The system features including an image coding apparatus using the image coding method, and an image coding and decoding apparatus including an image decoding apparatus using the image decoding method. The other configurations of the system can be appropriately changed depending on a case.

FIG. 20 illustrates an overall configuration of a content providing system ex100 for implementing content distribution services. The area for providing communication services is divided into cells of desired size, and base stations ex106 to ex110 which are fixed wireless stations are placed in each of the cells.

The content providing system ex100 is connected to devices, such as a computer ex111, a personal digital assistant (PDA) ex112, a camera ex113, a cellular phone ex114, and a game machine ex115, via an Internet ex101, an Internet service provider ex102, a telephone network ex104, as well as the base stations ex106 to ex110.

However, the configuration of the content providing system ex100 is not limited to the configuration shown in FIG. 20, and a combination in which any of the elements are connected is acceptable. In addition, each of the devices may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing moving images. A camera ex116, such as a digital video camera, is capable of capturing both still images and moving images. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of a live show and others. For such a distribution, a content (for example, video of a music live show) captured by the user using the camera ex113 is coded as described above in each of Embodiments, and the coded content is transmitted to the streaming server ex103. On the other hand, the streaming server ex103 carries out stream distribution of the received content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (that is, functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and the moving images captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, generally, the computer ex111 and an LSI ex500 included in each of the devices perform such encoding and decoding processes. The LSI ex500 may be configured of a single chip or a plurality of chips. Software for encoding and decoding moving pictures may be integrated into some type of a recording medium (such as a CD-ROM, a flexible disk, a hard disk) that is readable by the computer ex111 and others, and the encoding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients can receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 21:
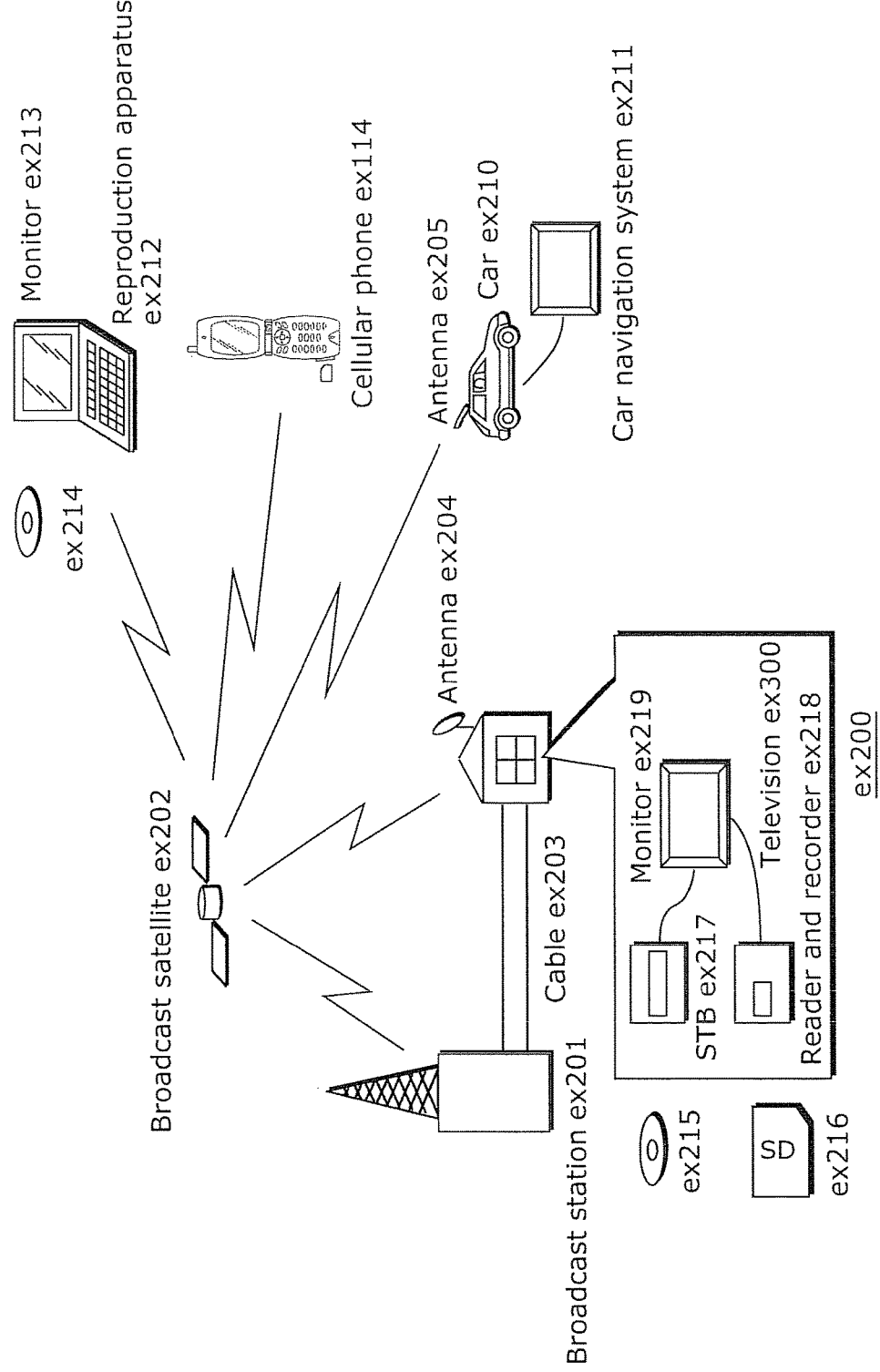
FIG. 21 illustrates an overall configuration of a digital broadcasting system.

The present disclosure is not limited to the above-mentioned content providing system ex100, and at least either the moving picture coding apparatus (image coding apparatus) or the moving picture decoding apparatus (image decoding apparatus) described in each of Embodiments can be incorporated into a digital broadcasting system ex200 as shown in FIG. 21. More specifically, a broadcast station ex201 communicates or transmits, via radio waves to a broadcast satellite ex202, multiplexed data obtained by multiplexing the audio data onto the video data. The video data is data coded according to the moving picture coding method described in each of Embodiments (that is, data coded by the image coding apparatus according to the aspect of the present disclosure). Upon receipt of the video data, the broadcast satellite ex202 transmits radio waves for broadcasting. Then, a home-use antenna ex204 capable of receiving a satellite broadcast receives the radio waves. A device, such as a television (receiver) ex300 and a set top box (STB) ex217, decodes the received multiplexed data and reproduces the data (that is, functions as the image decoding apparatus according to the aspect of the present disclosure).

Furthermore, a reader/recorder ex218 that (i) reads and decodes the multiplexed data recorded on a recording media ex215, such as a DVD and a BD, or (ii) codes video signals in the recording medium ex215, and in some cases, writes data obtained by multiplexing an audio signal on the coded data can include the moving picture decoding apparatus or the moving picture coding apparatus as shown in each of Embodiments. In this case, the reproduced video signals are displayed on the monitor ex219, and another apparatus or system can reproduce the video signals, using the recording medium ex215 on which the multiplexed data is recorded. Furthermore, it is also possible to implement the moving picture decoding apparatus in the set top box ex217 connected to the cable ex203 for a cable television or the antenna ex204 for satellite and/or terrestrial broadcasting, so as to display the video signals on the monitor ex219 of the television ex300. The moving picture decoding apparatus may be included not in the set top box but in the television ex300.

Figure 22:
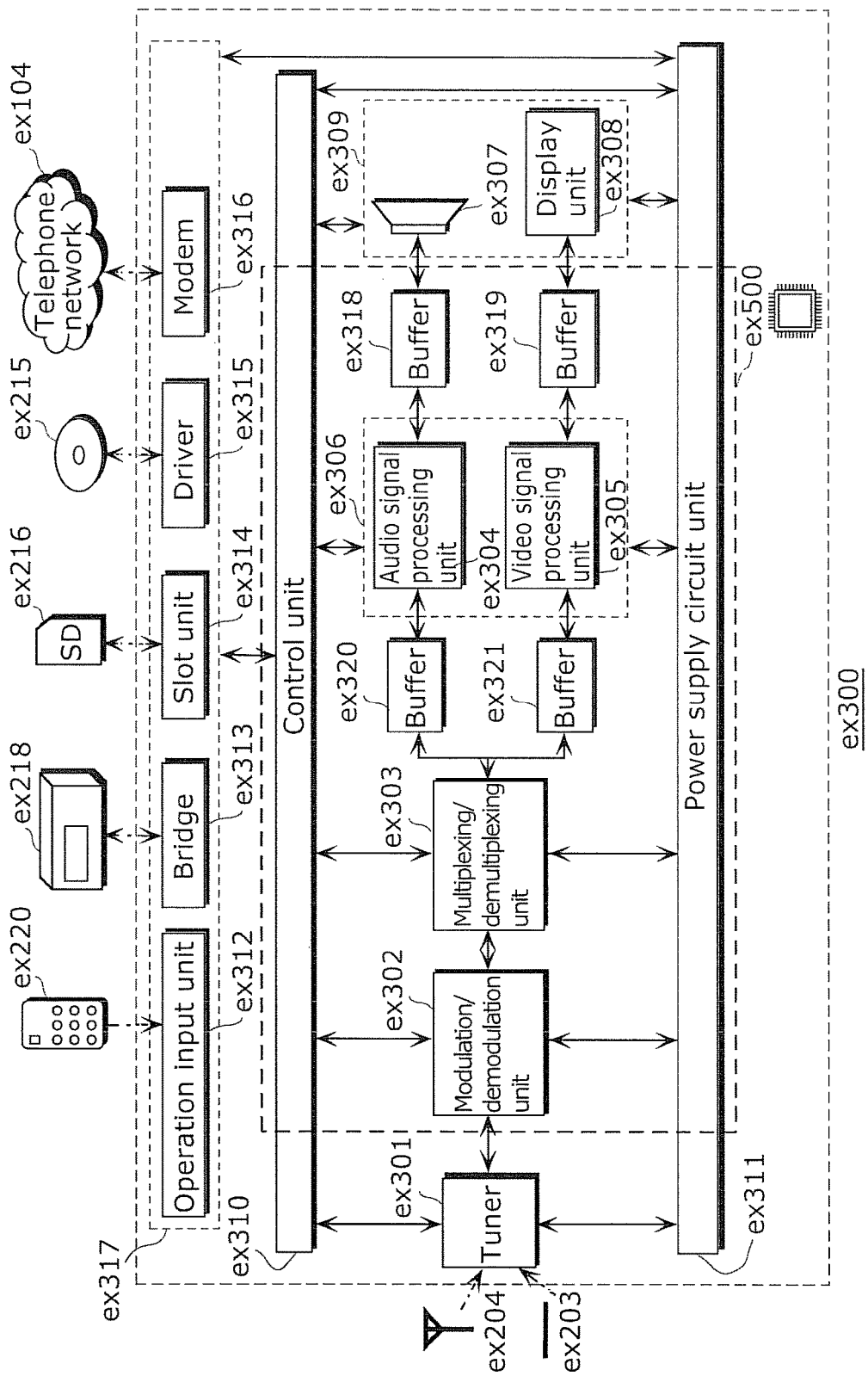
FIG. 22 illustrates a block diagram of an example of a configuration of a television.

FIG. 22 illustrates the television (receiver) ex300 that uses the moving picture coding method and the moving picture decoding method described in each of Embodiments. The television ex300 includes: a tuner ex301 that obtains or provides multiplexed data obtained by multiplexing the audio data and the video data through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes the video data and audio data coded by the signal processing unit ex306 into data.

Furthermore, the television ex300 further includes: a signal processing unit ex306 including an audio signal processing unit ex304 and a video signal processing unit ex305 that decode audio data and video data and code audio data and video data, respectively (which function as the image coding apparatus or the image decoding apparatus according to the aspect of the present disclosure); a speaker ex307 that provides the decoded audio signal; and an output unit ex309 including a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to one another through a synchronous bus.

First, a configuration in which the television ex300 decodes the multiplexed data obtained from outside through the antenna ex204 and others and reproduces the decoded data will be described. In the television ex300, upon receipt of a user operation from a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of Embodiments, in the television ex300. The output unit ex309 provides the decoded video signal and audio signal outside. When the output unit ex309 provides the video signal and the audio signal, the signals may be temporarily stored in buffers ex318 and ex319, and others so that the signals are reproduced in synchronization with each other. Furthermore, the television ex300 may read the multiplexed data not through a broadcast and others but from the recording media ex215 and ex216, such as a magnetic disk, an optical disc, and an SD card. Next, a configuration in which the television ex300 codes an audio signal and a video signal, and transmits the data outside or writes the data on a recording medium will be described. In the television ex300, upon receipt of a user operation from the remote controller ex220 and others, the audio signal processing unit ex304 codes an audio signal, and the video signal processing unit ex305 codes a video signal, under control of the control unit ex310 using the coding method as described in each of Embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in buffers ex320 and ex321, and others so that the signals are reproduced in synchronization with each other. Here, the buffers ex318 to ex321 may be plural as illustrated, or at least one buffer may be shared in the television ex300. Furthermore, data may be stored in a buffer other than the buffers ex318 to ex321 so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be not capable of performing all the processes but capable of only one of receiving, decoding, and providing outside data.

Furthermore, when the reader/recorder ex218 reads or writes the multiplexed data from or in a recording medium, one of the television ex300 and the reader/recorder ex218 may decode or code the multiplexed data, and the television ex300 and the reader/recorder ex218 may share the decoding or encoding.

Figure 23:
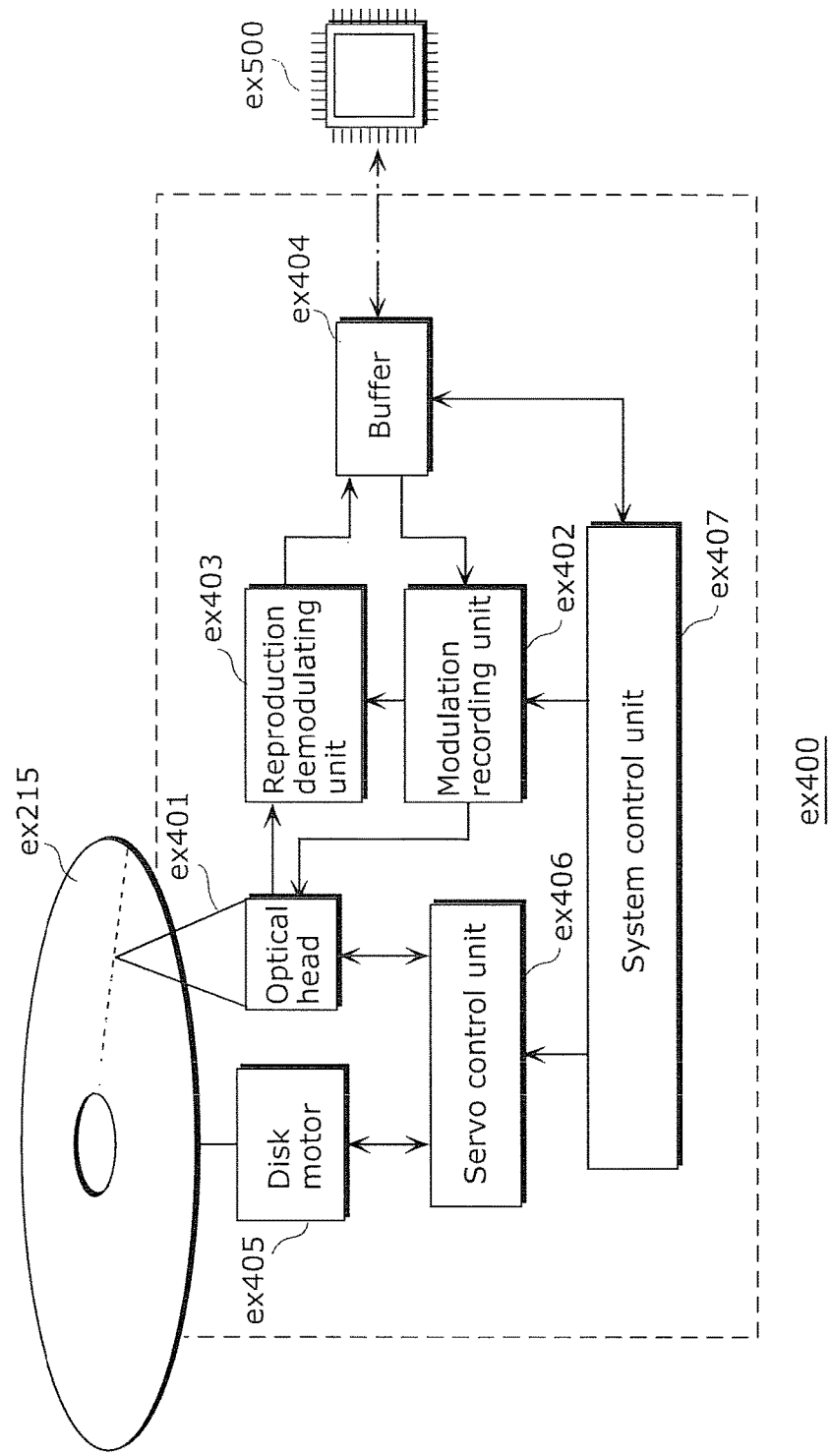
FIG. 23 illustrates a block diagram illustrating an example of a configuration of an information reproducing/recording unit that reads and writes information from or on a recording medium that is an optical disc.

As an example, FIG. 23 illustrates a configuration of an information reproducing/recording unit ex400 when data is read or written from or in an optical disc. The information reproducing/recording unit ex400 includes constituent elements ex401 to ex407 to be described hereinafter. The optical head ex401 irradiates a laser spot on a recording surface of the recording medium ex215 that is an optical disc to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. A disk motor ex405 rotates the recording medium ex215. A servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 24:
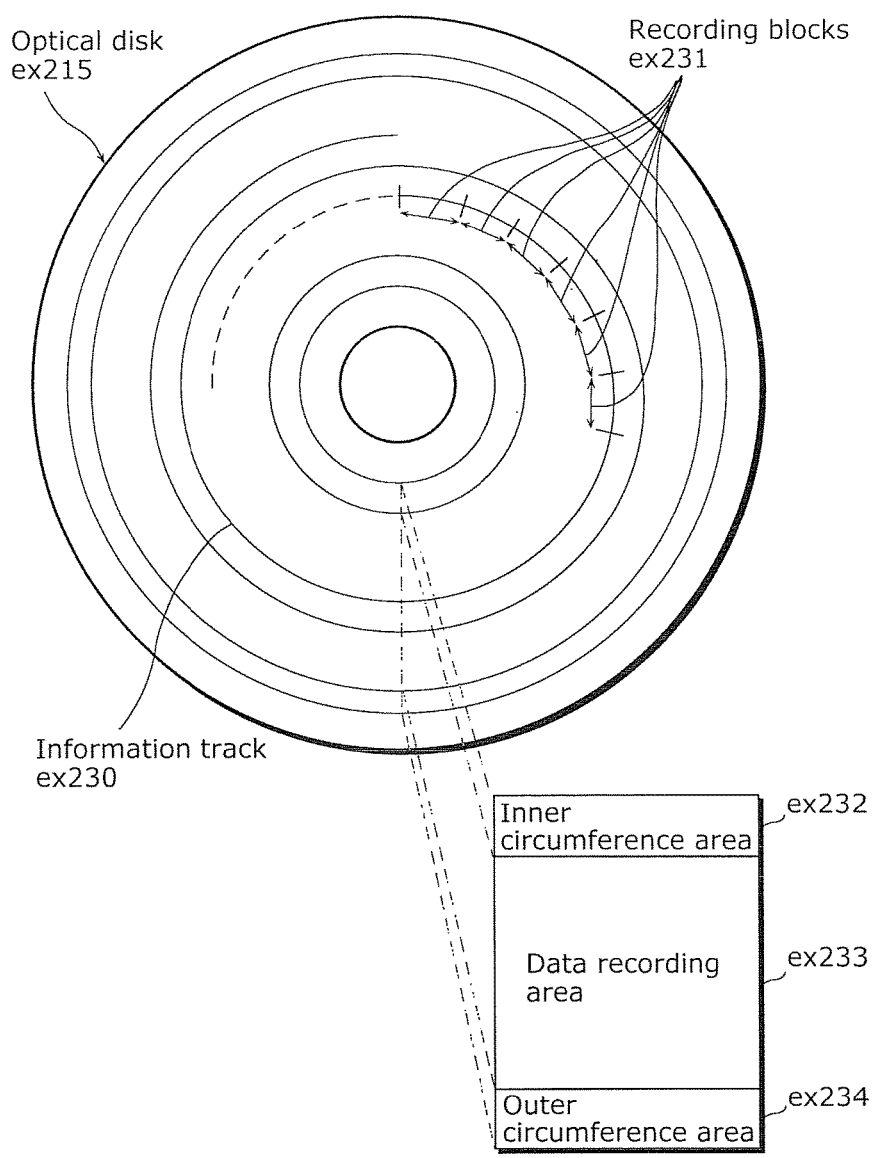
FIG. 24 illustrates an example of a configuration of a recording medium that is an optical disc.

FIG. 24 schematically illustrates the recording medium ex215 that is the optical disc. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. An apparatus that records and reproduces data reproduces the information track ex230 and reads the address information so as to determine the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio data, coded video data, or multiplexed data obtained by multiplexing the coded audio data and the coded video data, from and on the data recording area ex233 of the recording medium ex215.

Although an optical disc having a layer, such as a DVD and a BD is described as an example in the description, the optical disc is not limited to such, and may be an optical disc having a multilayer structure and capable of being recorded on a part other than the surface. Furthermore, the optical disc may have a structure for multidimensional recording/reproduction, such as recording of information using light of colors with different wavelengths in the same portion of the optical disc and recording information having different layers from various angles.

Furthermore, the car ex210 having the antenna ex205 can receive data from the satellite ex202 and others, and reproduce video on the display device such as the car navigation system ex211 set in the car ex210, in a digital broadcasting system ex200. Here, a configuration of the car navigation system ex211 will be the one for example, including a GPS receiving unit in the configuration illustrated in FIG. 22. The same will be true for the configuration of the computer ex111, the cellular phone ex114, and others.

Figure 25A:
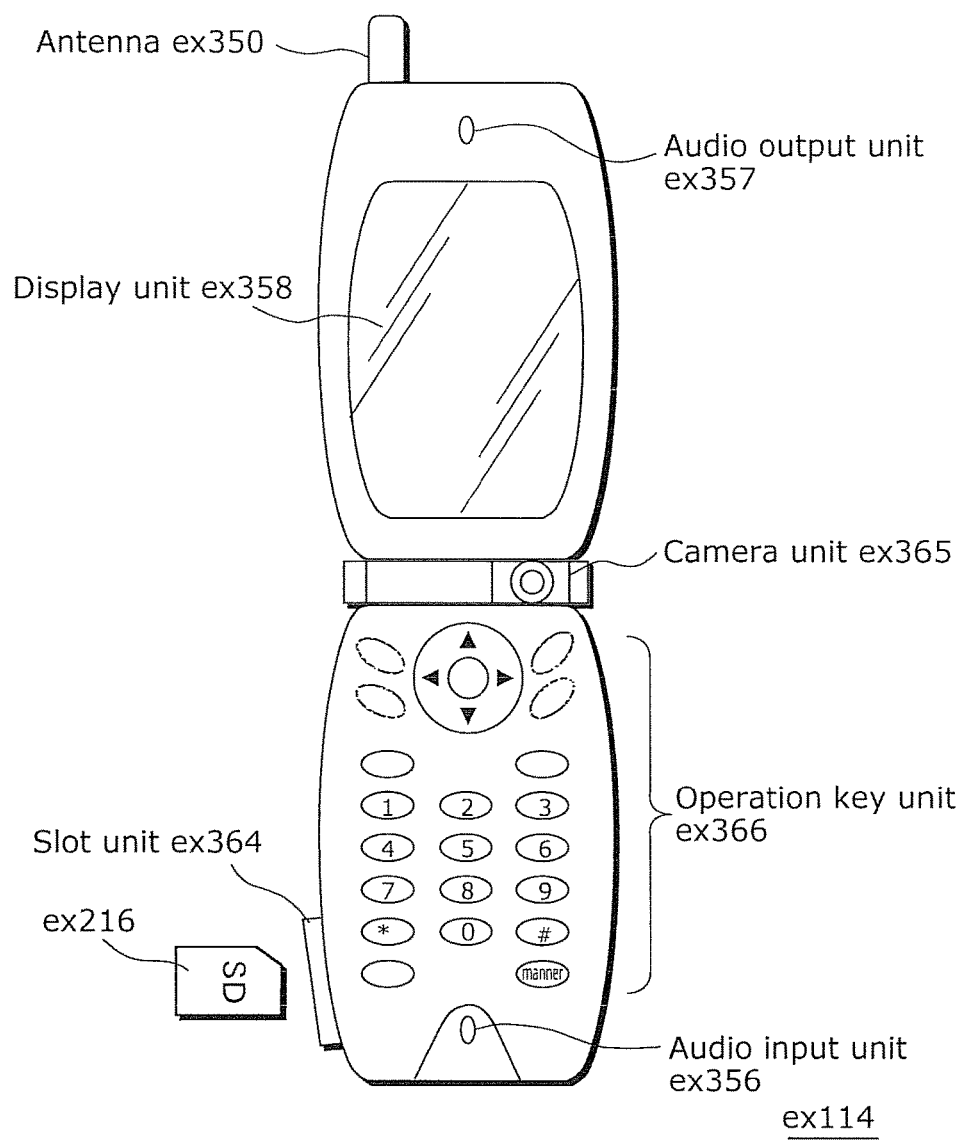
FIG. 25A illustrates an example of a cellular phone.

FIG. 25A illustrates the cellular phone ex114 that uses the moving picture coding method and the moving picture decoding method described in each of Embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including a set of operation keys ex366; an audio output unit ex357 such as a speaker for output of audio; an audio input unit ex356 such as a microphone for input of audio; a memory unit ex367 for storing captured video or still pictures, recorded audio, coded or decoded data of the received video, the still images, e-mails, or others; and a slot unit ex364 that is an interface unit for a recording medium that stores data in the same manner as the memory unit ex367.

Figure 25B:
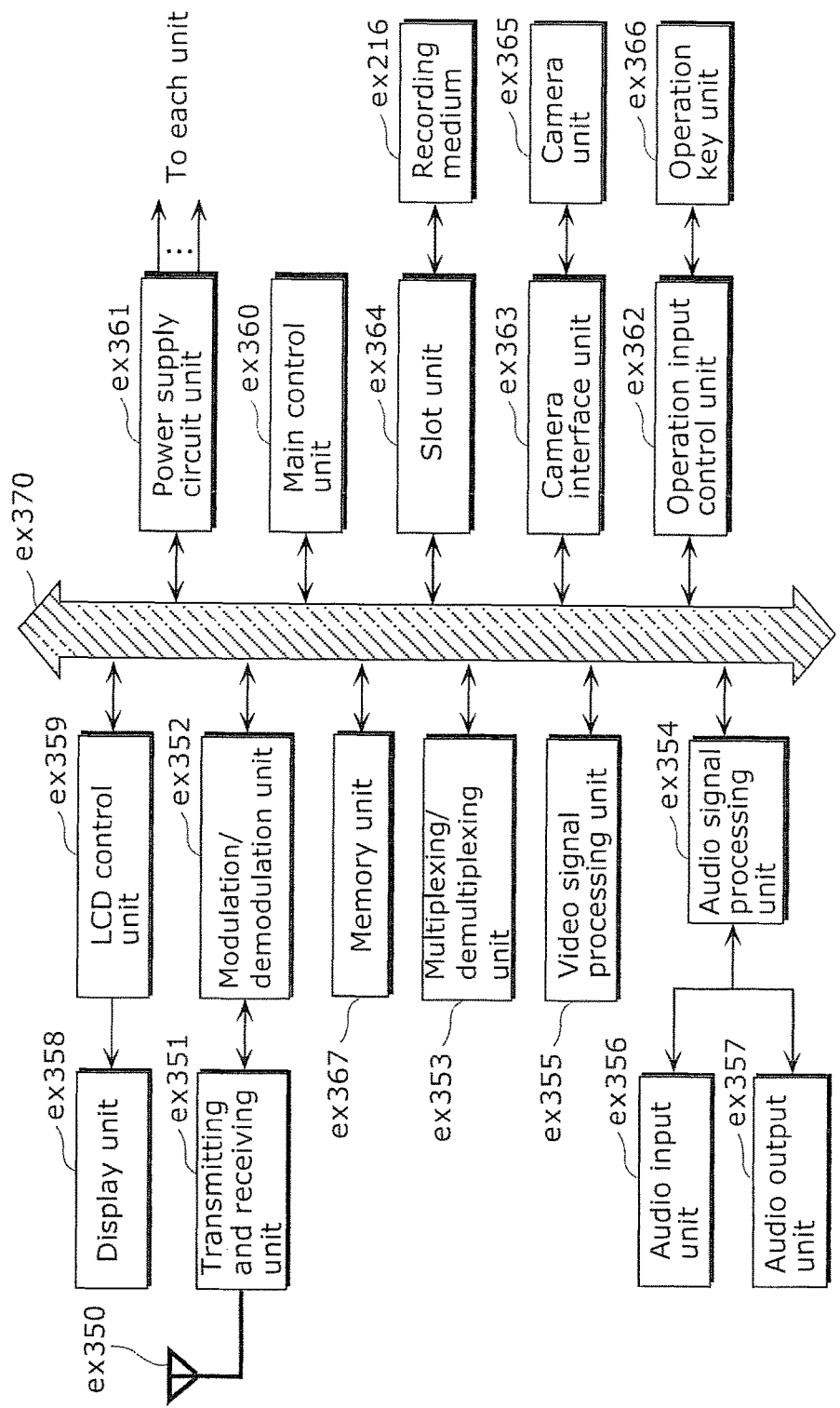
FIG. 25B illustrates a block diagram of an example of a configuration of the cellular phone.

Next, an example of a configuration of the cellular phone ex114 will be described with reference to FIG. 25B. In the cellular phone ex114, a main control unit ex360 designed to control overall each unit of the main body including the display unit ex358 as well as the operation keys ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation keys ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 (that is, functioning as the image coding apparatus according to the aspect of the present disclosure) compresses and codes video signals supplied from the camera unit ex365 using the moving picture coding method shown in each of Embodiments, and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 (that is, functioning as the image decoding apparatus according to the aspect of the present disclosure) decodes the video signal using a moving picture decoding method corresponding to the moving picture coding method shown in each of Embodiments, and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method or the moving picture decoding method in each of Embodiments can be used in any of the devices and systems described. Thus, the advantages described in each of Embodiments can be obtained.

Furthermore, the present disclosure is not limited to Embodiments, and various modifications and revisions are possible without departing from the scope of the present disclosure.

Embodiment 4

Video data can be generated by switching, as necessary, between (i) the moving picture coding method or the moving picture coding apparatus shown in each of Embodiments and (ii) a moving picture coding method or a moving picture coding apparatus in conformity with a different standard, such as MPEG-2, MPEG4-AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method or by the moving picture coding apparatus shown in each of Embodiments will be hereinafter described. The multiplexed data is a digital stream in the MPEG-2 Transport Stream format.

FIG. 26 illustrates a structure of multiplexed data. As illustrated in FIG. 26, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of a movie. Here, the primary video is normal video to be displayed on a screen, and the secondary video is video to be displayed on a smaller window in the main video. Furthermore, the interactive graphics stream represents an interactive screen to be generated by arranging the GUI components on a screen. The video stream is coded in the moving picture coding method or by the moving picture coding apparatus shown in each of Embodiments, or in a moving picture coding method or by a moving picture coding apparatus in conformity with a conventional standard, such as MPEG-2, MPEG4-AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary video to be mixed with the primary audio.

Figure 27:
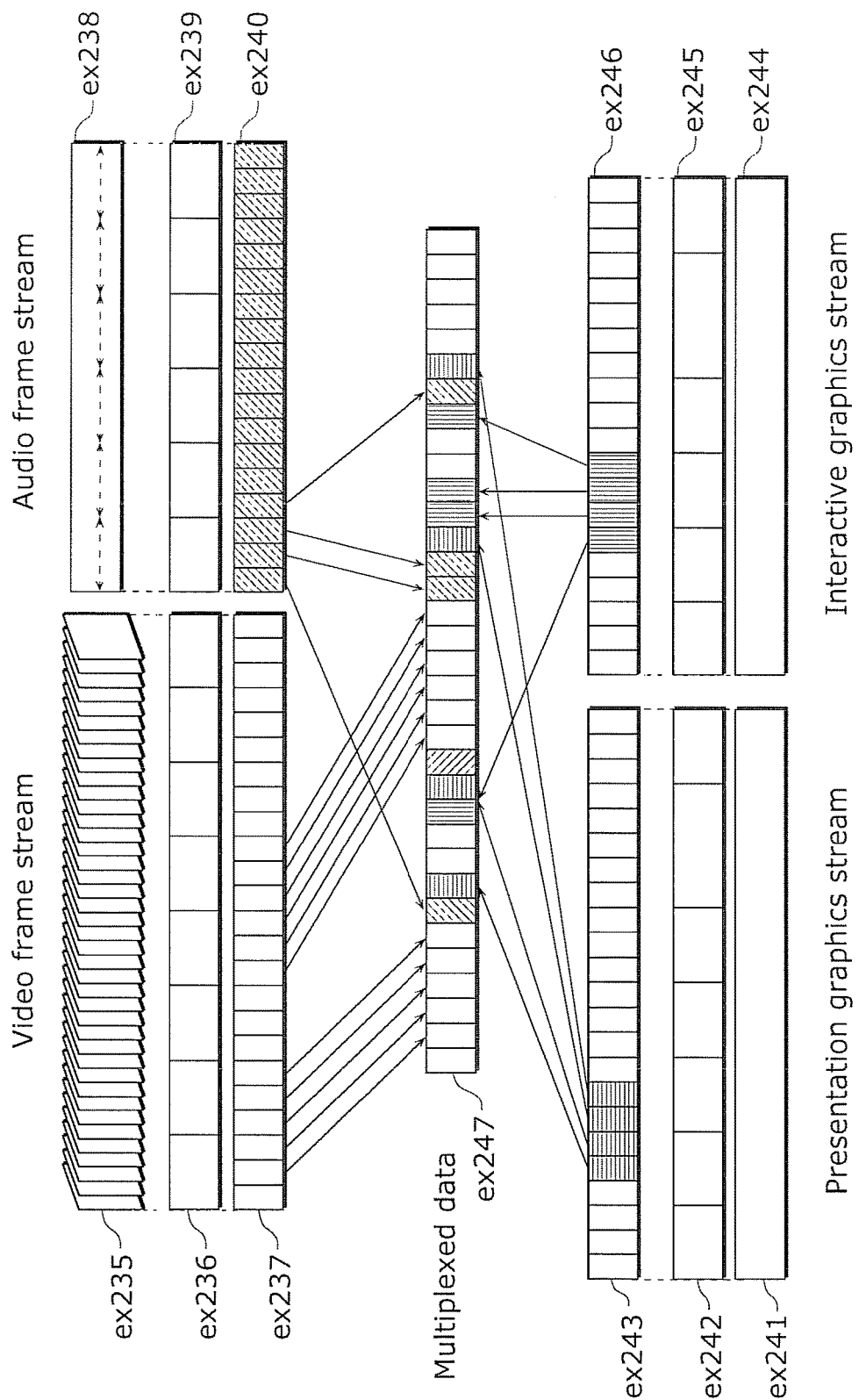
FIG. 27 schematically illustrates how each stream is multiplexed in multiplexed data.

FIG. 27 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 28:
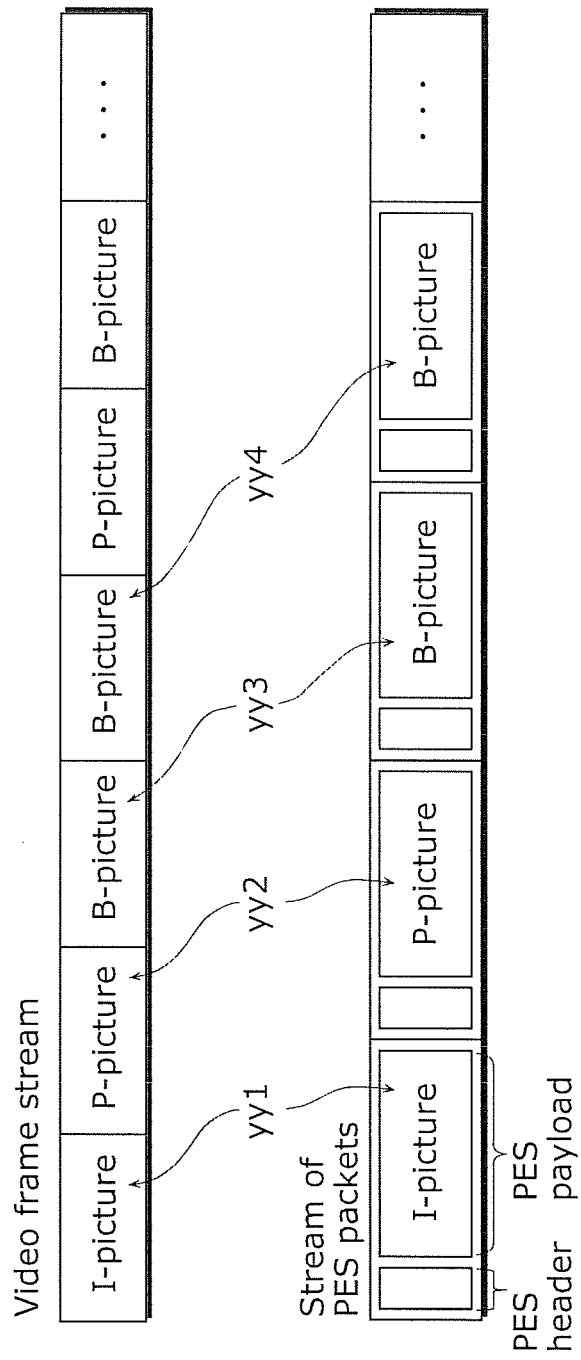
FIG. 28 illustrates how a video stream is stored in a stream of PES packets in more detail.

FIG. 28 illustrates how a video stream is stored in a stream of PES packets in more detail. The first bar in FIG. 28 shows a video frame stream in a video stream. The second bar shows the stream of PES packets. As indicated by arrows yy1, yy2, yy3, and yy4 in FIG. 28, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 29 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The numbers incrementing from the head of the multiplexed data are called source packet numbers (SPNs) as shown at the bottom of FIG. 29.

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 30:
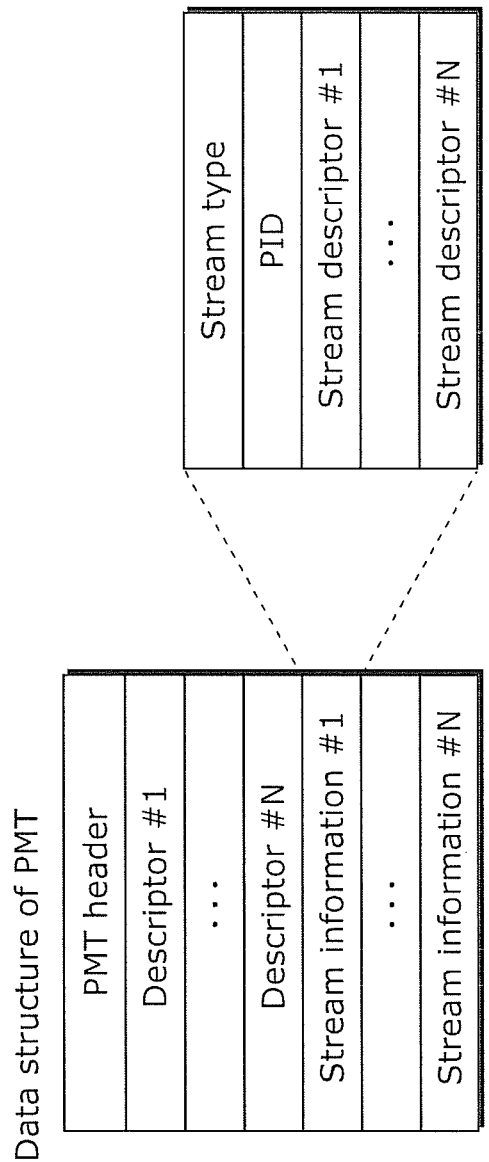
FIG. 30 illustrates a data structure of a PMT.

FIG. 30 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 31:
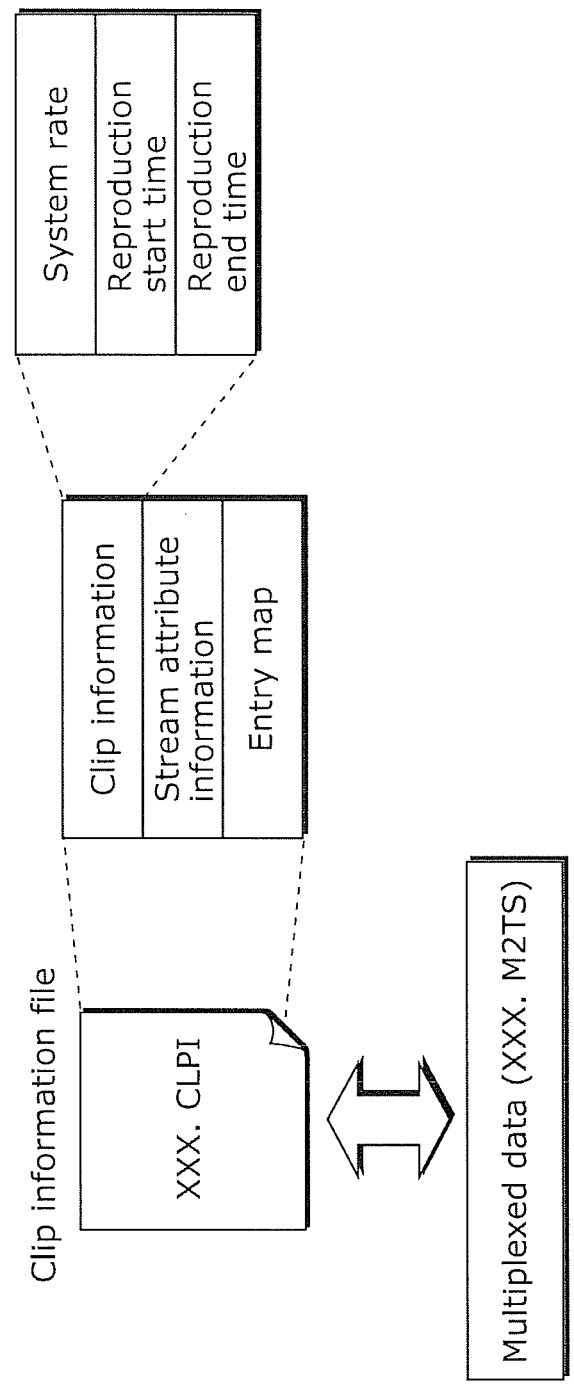
FIG. 31 illustrates an internal structure of multiplexed data information.

Each of the multiplexed data information files is management information of the multiplexed data as shown in FIG. 31. The multiplexed data information files are in one to one correspondence with the multiplexed data, and each of the files includes multiplexed data information, stream attribute information, and an entry map.

As illustrated in FIG. 31, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 32:
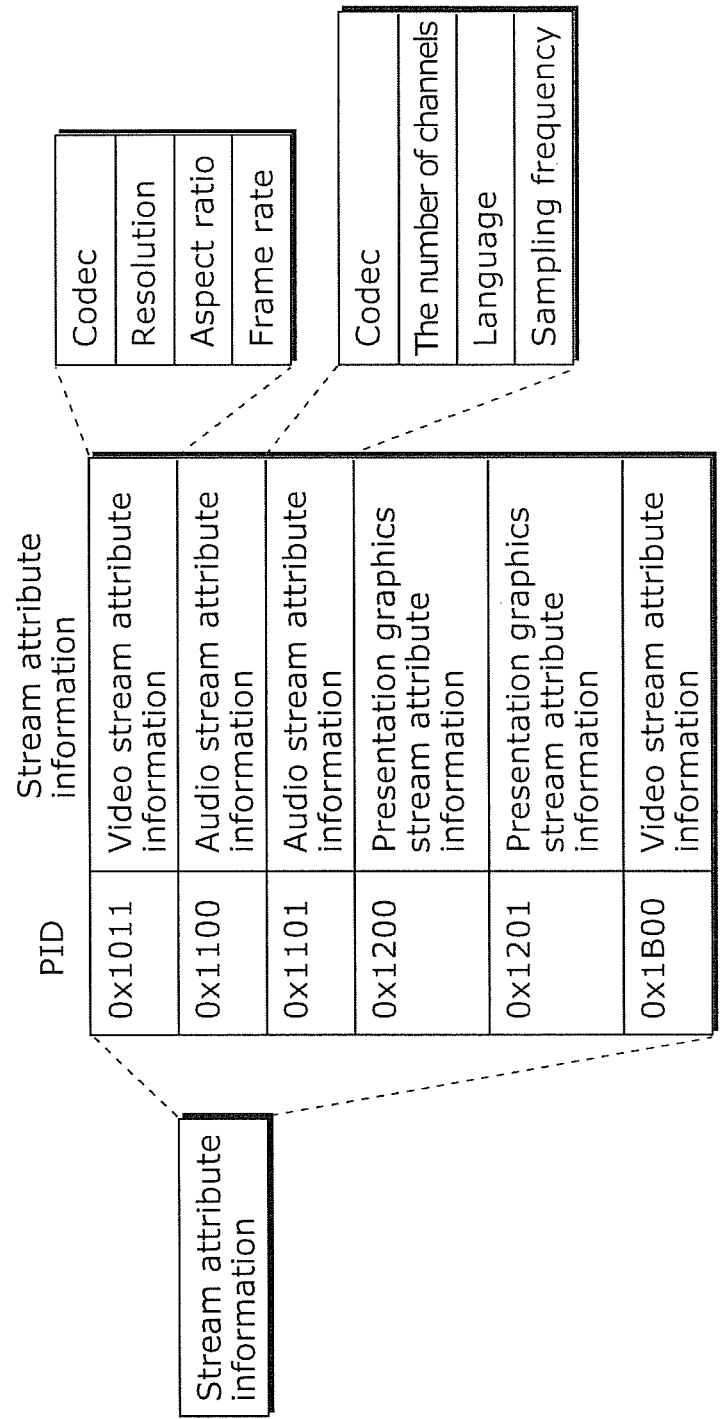
FIG. 32 illustrates an internal structure of stream attribute information.

As shown in FIG. 32, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In Embodiment 4, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of Embodiments includes a step or a unit for allocating unique information indicating video data generated by the moving picture coding method or the moving picture coding apparatus in each of Embodiments, to the stream type included in the PMT or the video stream attribute information. With the structure, the video data generated by the moving picture coding method or the moving picture coding apparatus described in each of Embodiments can be distinguished from video data that conforms to another standard.

Figure 33:
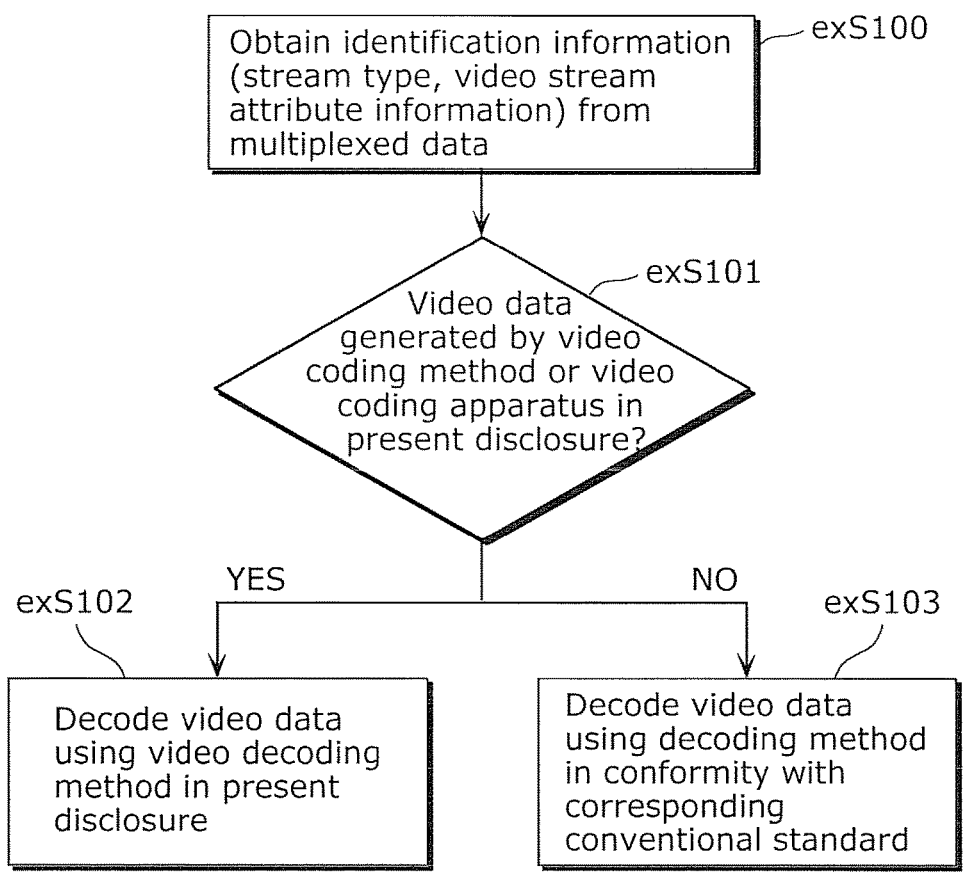
FIG. 33 illustrates steps for identifying video data.

Furthermore, FIG. 33 illustrates steps of the moving picture decoding method according to Embodiment 4. In Step exS100, the stream type included in the PMT or the video stream attribute information is obtained from the multiplexed data. Next, in Step exS101, it is determined whether or not the stream type or the video stream attribute information indicates that the multiplexed data is generated by the moving picture coding method or the moving picture coding apparatus in each of Embodiments. When it is determined that the stream type or the video stream attribute information indicates that the multiplexed data is generated by the moving picture coding method or the moving picture coding apparatus in each of Embodiments, in Step exS102, the stream type or the video stream attribute information is decoded by the moving picture decoding method in each of Embodiments. Furthermore, when the stream type or the video stream attribute information indicates conformance to the conventional standards, such as MPEG-2, MPEG4-AVC, and VC-1, in Step exS103, the stream type or the video stream attribute information is decoded by a moving picture decoding method in conformity with the conventional standards.

As such, allocating a new unique value to the stream type or the video stream attribute information enables determination whether or not the moving picture decoding method or the moving picture decoding apparatus that is described in each of Embodiments can perform decoding. Even upon an input of multiplexed data that conforms to a different standard, an appropriate decoding method or apparatus can be selected. Thus, it becomes possible to decode information without any error. Furthermore, the moving picture coding method or apparatus, or the moving picture decoding method or apparatus in Embodiment 4 can be used in the devices and systems described above.

Embodiment 5

Figure 34:
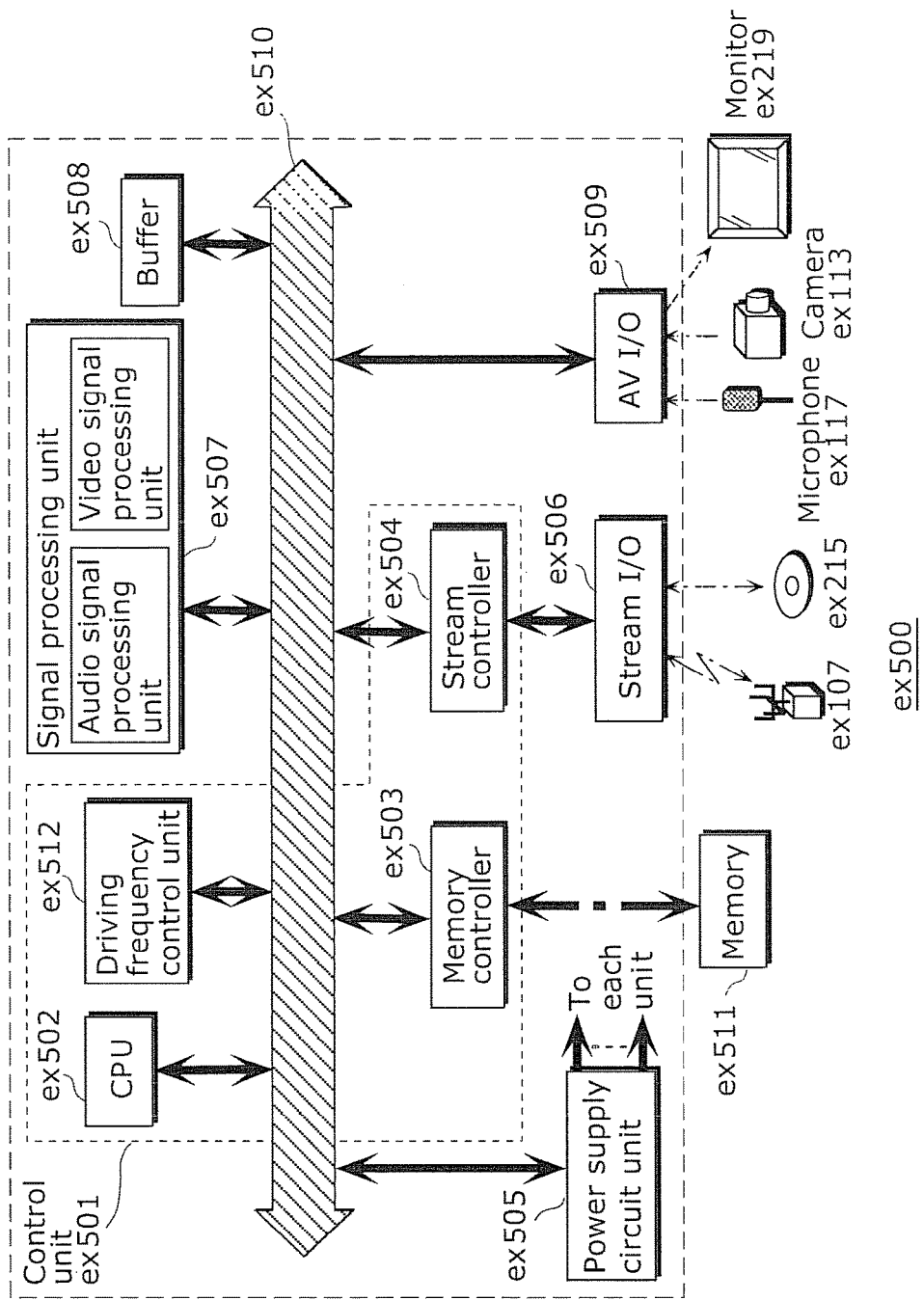
FIG. 34 illustrates a block diagram illustrating an example of a configuration of an integrated circuit for implementing a moving picture coding method and a moving picture decoding method according to each of Embodiments.

Each of the moving picture coding method, the moving picture coding apparatus, the moving picture decoding method, and the moving picture decoding apparatus in each of Embodiments is typically achieved in the form of an integrated circuit or a Large Scale Integrated (LSI) circuit. As an example of the LSI, FIG. 34 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of Embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording media ex215. When data sets are multiplexed, the data sets should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may include the signal processing unit ex507, or an audio signal processing unit that is a part of the signal processing unit ex507. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. The programmable logic device can typically execute the moving picture coding method and the moving picture decoding method according to Embodiments and Variations, by loading or reading, from a memory, the program included in software or firmware.

In the future, with advancement in semiconductor technology, a brand-new technology may replace LSI. The functional blocks can be integrated using such a technology. The possibility is that the present disclosure is applied to biotechnology.

Embodiment 6

When video data generated by the moving picture coding method or by the moving picture coding apparatus described in each of Embodiments is decoded, compared to the case of decoding video data that conforms to a conventional standard, such as MPEG-2, MPEG4-AVC, and VC-1, the computing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 35:
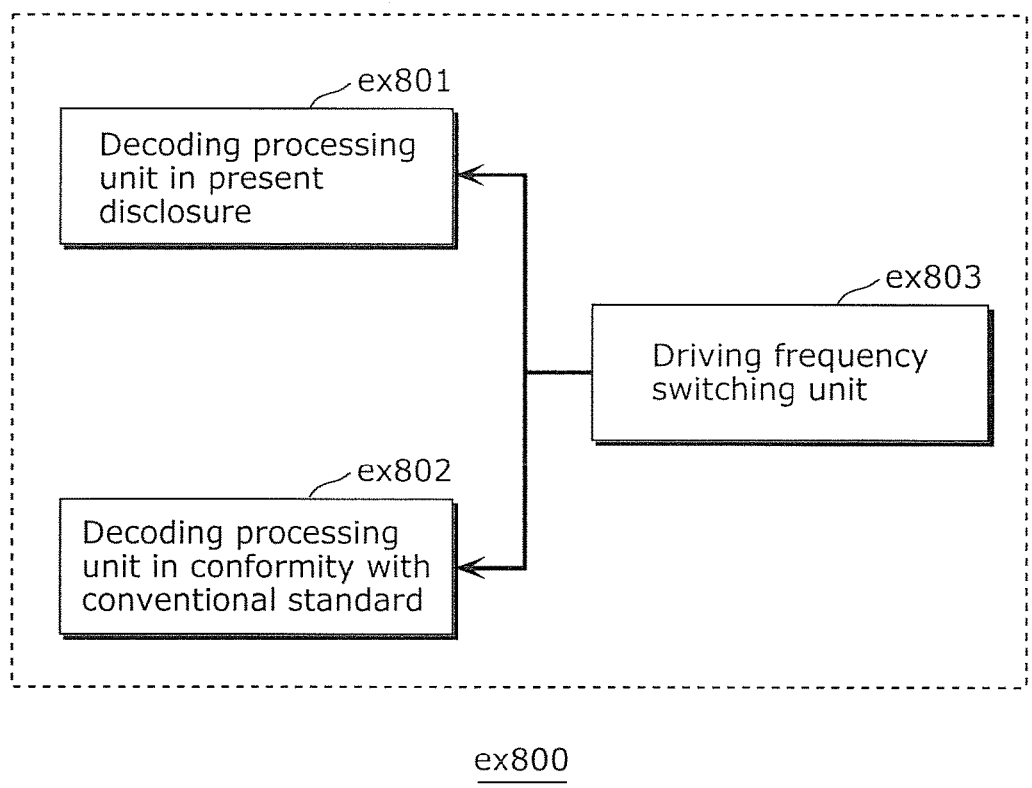
FIG. 35 illustrates a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 35 illustrates a configuration ex800 in Embodiment 6. A driving frequency switching unit ex803 sets a driving frequency to a higher driving frequency when video data is generated by the moving picture coding method or the moving picture coding apparatus described in each of Embodiments. Then, the driving frequency switching unit ex803 instructs a decoding processing unit ex801 that executes the moving picture decoding method described in each of Embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of Embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 34. Here, each of the decoding processing unit ex801 that executes the moving picture decoding method described in each of Embodiments and the decoding processing unit ex802 that conforms to the conventional standard corresponds to the signal processing unit ex507 in FIG. 34. The CPU ex502 determines to which standard the video data conforms. Then, the driving frequency control unit ex512 determines a driving frequency based on a signal from the CPU ex502. Furthermore, the signal processing unit ex507 decodes the video data based on a signal from the CPU ex502. For example, the identification information described in Embodiment 4 is probably used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 37. The driving frequency can be selected by storing the look-up table in the buffer ex508 and an internal memory of an LSI, and with reference to the look-up table by the CPU ex502.

Figure 36:
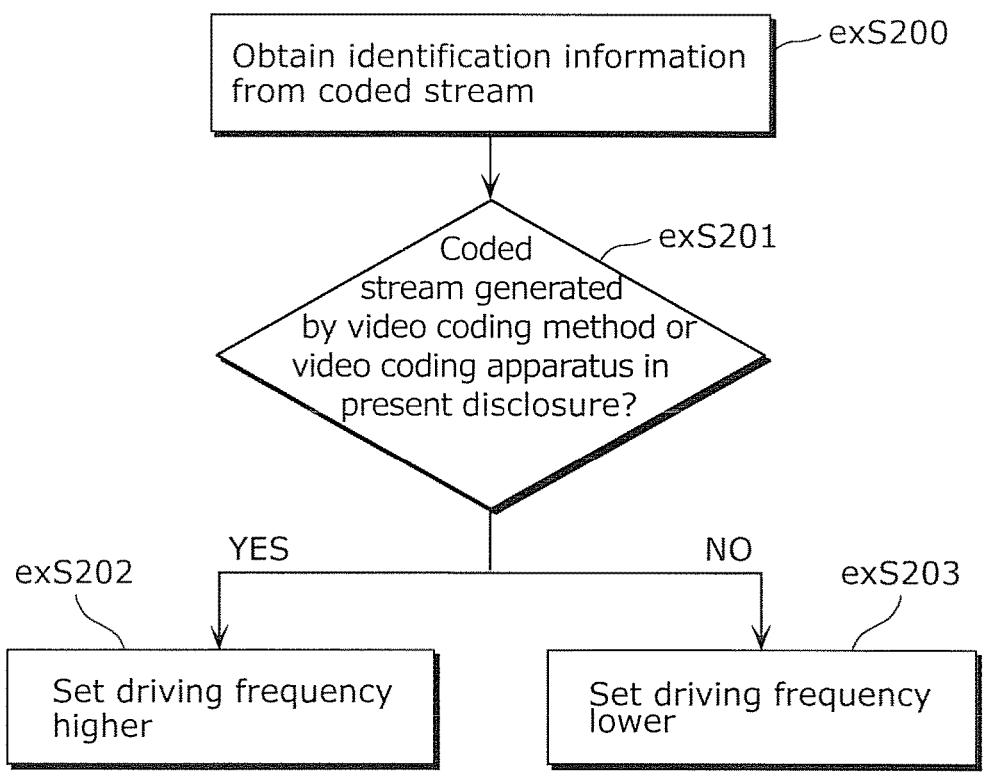
FIG. 36 illustrates steps for identifying video data and switching between driving frequencies.

FIG. 36 illustrates steps for executing a method in Embodiment 6. First, in Step exS200, the signal processing unit ex507 obtains identification information from the multiplexed data. Next, in Step exS201, the CPU ex502 determines whether or not the video data is generated based on the identification information by the coding method and the coding apparatus described in each of Embodiments. When the video data is generated by the coding method or the coding apparatus described in each of Embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG4-AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the coding method or the coding apparatus described in each of Embodiments.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the computing amount for decoding is larger, the driving frequency may be set higher, and when the computing amount for decoding is smaller, the driving frequency may be set lower as the method for setting the driving frequency. Thus, the setting method is not limited to the ones described above. For example, when the computing amount for decoding video data in conformity with MPEG4-AVC is larger than the computing amount for decoding video data generated by the moving picture coding method or the moving picture coding apparatus described in each of Embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method or the moving picture coding apparatus described in each of Embodiments, the voltage to be applied to the LSI ex500 or the apparatus including the LSI ex500 is probably set higher. When the identification information indicates that the video data conforms to the conventional standard, such as MPEG-2, MPEG4-AVC, and VC-1, the voltage to be applied to the LSI ex500 or the apparatus including the LSI ex500 is probably set lower. As another example, when the identification information indicates that the video data is generated by the moving picture coding method or the video coding apparatus described in each of Embodiments, the driving of the CPU ex502 does not probably have to be suspended. When the identification information indicates that the video data conforms to the conventional standard, such as MPEG-2, MPEG4-AVC, and VC-1, the driving of the CPU ex502 is probably suspended at a given time because the CPU ex502 has extra processing capacity. Even when the identification information indicates that the video data is generated by the moving picture coding method or the moving picture coding apparatus described in each of Embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG4-AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 7

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 38A:
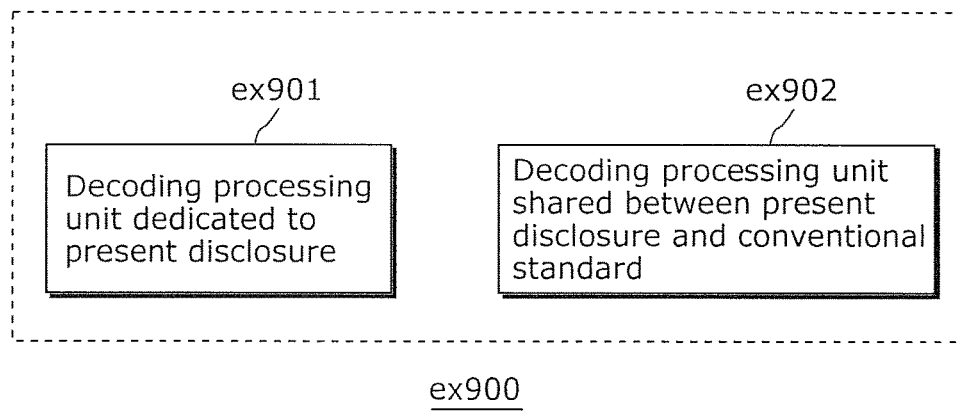
FIG. 38A illustrates an example of a configuration for sharing a module of a signal processing unit.

In order to solve the problems, what is conceived is a configuration in which the decoding processing unit for implementing the moving picture decoding method described in each of Embodiments and the decoding processing unit that conforms to the conventional standard, such as MPEG-2, MPEG4-AVC, and VC-1 are partly shared. Ex900 in FIG. 38A shows an example of the configuration. For example, the moving picture decoding method described in each of Embodiments and the moving picture decoding method that conforms to MPEG4-AVC have, partly in common, the details of processing, such as entropy coding, inverse quantization, deblocking filtering, and motion compensation. The details of processing to be shared probably include use of a decoding processing unit ex902 that conforms to MPEG4-AVC. In contrast, a dedicated decoding processing unit ex901 is probably used for other processing which is unique to the present disclosure and does not conform to MPEG-4 AVC. Since the aspect of the present disclosure particularly features entropy decoding, for example, the dedicated decoding processing unit ex901 is used for the entropy decoding. Otherwise, the decoding processing unit is probably shared for one of inverse quantization, deblocking filtering, and motion compensation, or all of the processing. The decoding processing unit for implementing the moving picture decoding method described in each of Embodiments may be shared for the processing to be shared, and a dedicated decoding processing unit may be used for processing unique to that of MPEG4-AVC.

Figure 38B:
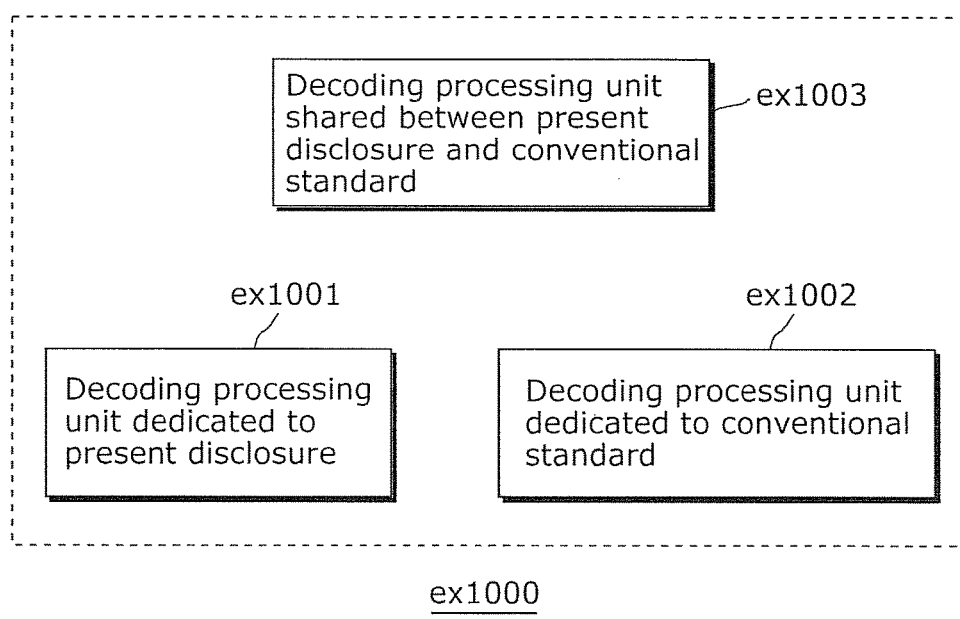
FIG. 38B illustrates an example of a configuration for sharing a module of a signal processing unit.

Furthermore, ex1000 in FIG. 38B shows another example in which processing is partly shared. This example uses a configuration including a dedicated decoding processing unit ex1001 that supports the processing unique to the aspect of the present disclosure, a dedicated decoding processing unit ex1002 that supports the processing unique to another conventional standard, and a decoding processing unit ex1003 that supports processing to be shared between the moving picture decoding method in the aspect of the present disclosure and the conventional moving picture decoding method. Here, the dedicated decoding processing units ex1001 and ex1002 are not necessarily specialized for the processing of the aspect of the present disclosure and the processing of the conventional standard, and may be the ones capable of implementing general processing. Furthermore, the configuration of Embodiment 7 can be implemented by the LSI ex500.

As such, reducing the scale of the circuit of an LSI and reducing the cost are possible by sharing the decoding processing unit for the processing to be shared between the moving picture decoding method in the present disclosure and the moving picture decoding method in conformity with the conventional standard.

The herein disclosed subject matter is to be considered descriptive and illustrative only, and the appended Claims are of a scope intended to cover and encompass not only the particular embodiments disclosed, but also equivalent structures, methods, and/or uses.

INDUSTRIAL APPLICABILITY

The moving picture coding apparatus or the moving picture decoding apparatus according to an aspect of the present disclosure is applicable to, for example, television receivers, digital video recorders, car navigation systems, mobile phones, digital cameras, and digital video cameras.

The invention claimed is:

1. A moving picture coding method for coding an input image, the method comprising:
converting, using a binarizer, a value of a first parameter into a first binary signal, the first parameter identifying a type of a sample offset process to be applied to a reconstructed image corresponding to the input image;
coding a first portion of the first binary signal through context-adaptive arithmetic coding; and
coding a second portion of the first binary signal through bypass arithmetic coding using a fixed probability,
wherein a variable probability is not used in the bypass arithmetic coding,
the first portion of the first binary signal is composed of a head bit of the first binary signal, and
the second portion of the first binary signal is composed of one or more remaining bits of the first binary signal.

2. The moving picture coding method according to claim 1,
wherein the sample offset process is not applied to the reconstructed image when the value of the first parameter is equal to a predetermined value, and
the first portion of the first binary signal indicates whether or not the value of the first parameter is equal to the predetermined value.

3. The moving picture coding method according to claim 1, further comprising:
converting at least one of a value of a second parameter and a value of a third parameter into a second binary signal, the second parameter identifying an intra prediction mode, the third parameter identifying a candidate to be used for inter prediction from a list of candidates each including at least one motion vector;
coding a first portion of the second binary signal through the context-adaptive arithmetic coding; and
coding a second portion of the second binary signal through the bypass arithmetic coding when the second binary signal includes the second portion subsequent to the first portion,
wherein a bit length of the first portion of the first binary signal is identical to a bit length of the first portion of the second binary signal.

4. The moving picture coding method according to claim 1,
wherein the first binary signal includes one or more first bits having a first symbol when the value of the first parameter is larger than 0, the number of the first bits being equal to the value of the first parameter, and
the first binary signal (a) further includes one or more second bits having a second symbol when the value of the first parameter is smaller than a maximum value, and (b) does not include the second bits when the value of the first parameter is equal to the maximum value.

5. A moving picture coding apparatus that codes an input image, the apparatus comprising:
a binarizer that converts a value of a first parameter into a first binary signal, the first parameter identifying a type of a sample offset process to be applied to a reconstructed image corresponding to the input image;
a first coder that codes a first portion of the first binary signal through context-adaptive arithmetic coding; and
a second coder that codes a second portion of the first binary signal through bypass arithmetic coding using a fixed probability,
wherein a variable probability is not used in the bypass arithmetic coding,
the first portion of the first binary signal is composed of a head bit of the first binary signal, and
the second portion of the first binary signal is composed of one or more remaining bits of the first binary signal.

6. A moving picture coding and decoding apparatus, comprising:
the moving picture coding apparatus according to claim 5; and
a moving picture decoding apparatus that decodes a coded image, the moving picture decoding apparatus including:
a first decoder that decodes a coded first portion of a first binary signal through context-adaptive arithmetic decoding; and
a second decoder that decodes a second coded portion of a first binary signal through bypass arithmetic decoding using a fixed probability,
wherein a variable probability is not used in the bypass arithmetic decoding,
the first portion of the first binary signal is composed of a head bit of the first binary signal,
the second portion of the first binary signal is composed of one or more remaining bits of the first binary signal,
the first binary signal corresponding to a value of a first parameter identifying a type of a sample offset process to be applied to a reconstructed image obtained from the coded image, and
the moving picture decoding apparatus further includes an inverse binarizer that converts the decoded first binary signal into the value of the first parameter.

7. The moving picture coding method according to claim 1,
wherein a type of the sample offset process from among a band offset process and an edge offset process to be applied is identified by the second portion of the first binary signal.

* * * * *